(12) United States Patent
Belcher

(10) Patent No.: US 12,030,023 B2
(45) Date of Patent: *Jul. 9, 2024

(54) GAS DISPENSING METHOD AND APPARATUS

(71) Applicant: Winepro2, LTD, Mayfield, OH (US)

(72) Inventor: Thomas Belcher, Mayfield, OH (US)

(73) Assignee: WINEPRO2, LTD, Mayfield, OH (US)

( * ) Notice: Subject to any disclaimer, the term of this patent is extended or adjusted under 35 U.S.C. 154(b) by 993 days.

This patent is subject to a terminal disclaimer.

(21) Appl. No.: 16/544,564

(22) Filed: Aug. 19, 2019

(65) Prior Publication Data

US 2020/0139312 A1    May 7, 2020

Related U.S. Application Data

(63) Continuation-in-part of application No. 13/091,477, filed on Apr. 21, 2011, now Pat. No. 10,384,173.

(60) Provisional application No. 61/326,324, filed on Apr. 21, 2010.

(51) Int. Cl.
| | |
|---|---|
| *B01F 23/236* | (2022.01) |
| *A23L 2/54* | (2006.01) |
| *B01F 23/237* | (2022.01) |
| *B01F 101/17* | (2022.01) |

(52) U.S. Cl.
CPC ............ *B01F 23/2362* (2022.01); *A23L 2/54* (2013.01); *A23V 2002/00* (2013.01); *B01F 23/237612* (2022.01); *B01F 2101/17* (2022.01)

(58) Field of Classification Search
CPC ........ B01F 23/237611; B01F 23/23611; B01F 23/23123; B01F 23/2362; B01F 35/883; B01F 2101/17; B01F 23/237612; A23L 2/54; C12H 1/14; A23V 2002/00
USPC ........................................................ 99/323.2
See application file for complete search history.

(56) References Cited

U.S. PATENT DOCUMENTS

| | | | | |
|---|---|---|---|---|
| 2,035,619 A | * | 3/1936 | Robison ..................... | A23L 2/44 426/474 |
| 2,322,183 A | * | 6/1943 | Ward .................... | B67D 1/0412 426/477 |
| 2,365,524 A | * | 12/1944 | Court ...................... | A61J 1/067 222/542 |
| 2,418,036 A | * | 3/1947 | Lane ...................... | B65D 83/20 222/509 |
| 2,596,310 A | * | 5/1952 | Vita ....................... | B65D 35/28 222/103 |

(Continued)

OTHER PUBLICATIONS

International Search Report, PCT/US2019/ 047111, dated Oct. 17, 2019.

(Continued)

*Primary Examiner* — Eric S Stapleton
(74) *Attorney, Agent, or Firm* — FisherBroyles, LLP; W. Scott Harders

(57) ABSTRACT

An apparatus and method for delivering oxygen, oxygen enriched air, or air through a delivery system from one vessel containing a higher pressure concentration of the gas into another vessel containing a liquid at atmospheric pressure introduced through a diffuser or dispersion nozzle including one or more passages in a controlled regulated manner. This process and apparatus provide the liquid with an oxygenation level for improved flavor in a short amount of time.

20 Claims, 23 Drawing Sheets

(56) References Cited

U.S. PATENT DOCUMENTS

| | | | | |
|---|---|---|---|---|
| 2,673,123 A * | 3/1954 | Benoit | B05B 11/043 | 239/327 |
| 2,794,581 A * | 6/1957 | Braun | B65D 47/242 | 222/521 |
| 2,982,987 A * | 5/1961 | Knapp | B65D 47/42 | 15/236.08 |
| 3,460,589 A * | 8/1969 | Justis | B67C 3/222 | 141/69 |
| 3,552,726 A * | 1/1971 | Kraft | B01F 23/2362 | 261/50.1 |
| 3,618,905 A * | 11/1971 | Primus | B67D 1/04 | 261/50.1 |
| 3,752,452 A * | 8/1973 | Iannelli | B01F 23/2362 | 261/DIG. 7 |
| 3,756,576 A * | 9/1973 | Tremolada | B01F 23/2363 | 261/DIG. 7 |
| 4,187,262 A * | 2/1980 | Fessler | B67D 1/0057 | 261/DIG. 7 |
| 4,298,551 A * | 11/1981 | Adolfsson | B01F 35/6052 | 137/859 |
| 4,304,736 A * | 12/1981 | McMillin | B67D 1/103 | 417/396 |
| 4,395,940 A * | 8/1983 | Child | B01F 33/5014 | 261/DIG. 7 |
| 4,399,081 A * | 8/1983 | Mabb | B01F 33/5014 | 261/DIG. 7 |
| 4,401,016 A * | 8/1983 | Adams | B01F 33/5014 | 261/DIG. 7 |
| 4,494,452 A * | 1/1985 | Barzso | B01F 23/2361 | 99/323.1 |
| 4,518,541 A * | 5/1985 | Harris | B01F 35/88 | 261/DIG. 7 |
| 4,526,730 A * | 7/1985 | Cochran | B01F 23/23611 | 426/477 |
| 4,588,536 A * | 5/1986 | Adolfsson | B67D 1/0406 | 261/DIG. 7 |
| 4,595,121 A * | 6/1986 | Schultz | B67D 1/0885 | 116/DIG. 8 |
| 4,610,282 A * | 9/1986 | Brooks | B01F 33/5014 | 426/477 |
| 4,636,337 A * | 1/1987 | Gupta | A23L 2/54 | 261/DIG. 7 |
| 4,655,029 A * | 4/1987 | Weiss | B67C 7/0086 | 53/403 |
| 4,660,740 A * | 4/1987 | Brandon, Jr. | B67D 1/007 | 261/DIG. 7 |
| 4,719,056 A * | 1/1988 | Scott | B67D 1/0075 | 261/80 |
| 4,734,999 A * | 4/1988 | Fujisawa | C30B 25/14 | 261/122.1 |
| 4,785,724 A * | 11/1988 | Vassallo | C12H 1/14 | 99/323.1 |
| 4,850,269 A * | 7/1989 | Hancock | B01F 35/2112 | 261/DIG. 7 |
| 4,859,376 A * | 8/1989 | Hancock | B01F 25/21 | 261/DIG. 7 |
| 4,860,802 A * | 8/1989 | Yamaguchi | B65B 3/24 | 141/40 |
| 4,886,525 A * | 12/1989 | Hoover | A23L 2/54 | 95/266 |
| 4,940,164 A * | 7/1990 | Hancock | B01F 23/2312 | 261/DIG. 7 |
| 4,940,212 A * | 7/1990 | Burton | B01F 23/2361 | 261/DIG. 7 |
| 4,999,140 A * | 3/1991 | Sutherland | B01F 23/23611 | 261/DIG. 7 |
| 5,002,201 A * | 3/1991 | Hancock | B67D 1/0067 | 222/61 |
| 5,124,088 A * | 6/1992 | Stumphauzer | B67D 1/0057 | 261/DIG. 7 |
| 5,139,708 A * | 8/1992 | Scott | B67D 1/0068 | 222/64 |
| 5,154,112 A * | 10/1992 | Wettern | B01F 23/2361 | 99/323.1 |
| 5,329,975 A * | 7/1994 | Heitel | B65D 83/42 | 261/DIG. 7 |
| 5,458,165 A * | 10/1995 | Liebmann, Jr. | B65B 31/04 | 261/DIG. 7 |
| 5,587,193 A * | 12/1996 | Kazemzadeh | A23K 40/20 | 426/651 |
| 5,595,104 A * | 1/1997 | Delaplaine | B01F 23/2361 | 99/323.1 |
| 5,603,257 A * | 2/1997 | Kateman | A23G 9/20 | 99/323.2 |
| 5,635,232 A * | 6/1997 | Wallace | A23L 2/54 | 261/DIG. 7 |
| 5,667,107 A * | 9/1997 | Lindsey | B65D 23/003 | 222/173 |
| 5,678,731 A * | 10/1997 | Okamura | B65D 35/28 | 222/391 |
| 5,718,161 A * | 2/1998 | Beadle | C12C 13/10 | 99/278 |
| 5,758,571 A * | 6/1998 | Kateman | B67D 1/0036 | 99/323.1 |
| 5,870,944 A * | 2/1999 | Vander Zalm | B01F 23/2361 | 261/DIG. 7 |
| 6,079,460 A * | 6/2000 | Ballan | B67C 3/222 | 141/54 |
| 6,439,549 B1 * | 8/2002 | Loov | B67D 1/0406 | 261/DIG. 7 |
| 6,508,163 B1 * | 1/2003 | Weatherill | B01F 35/7176 | 99/275 |
| 7,051,901 B2 * | 5/2006 | Hickert | B65D 81/245 | 222/401 |
| 7,101,265 B1 * | 9/2006 | Schur | B24C 9/00 | 451/101 |
| 7,104,033 B2 * | 9/2006 | Krulitsch | B67C 3/004 | 53/167 |
| 7,350,545 B2 * | 4/2008 | Ruble | B67C 3/281 | 141/147 |
| 8,348,245 B2 * | 1/2013 | Fischer | B01F 23/232 | 261/DIG. 7 |
| 10,384,173 B2 * | 8/2019 | Belcher | B01F 23/23611 | |
| 2002/0014276 A1 * | 2/2002 | Clusserath | B67C 3/10 | 141/145 |
| 2002/0056733 A1 * | 5/2002 | Lasserre | B65D 83/40 | 222/402.21 |
| 2004/0016347 A1 * | 1/2004 | Gruenewald | A47J 43/128 | 99/323.1 |
| 2005/0199652 A1 * | 9/2005 | Sitz | B65D 81/2053 | 222/131 |
| 2006/0000361 A1 * | 1/2006 | Kutyev | A23L 2/54 | 99/275 |
| 2007/0069040 A1 * | 3/2007 | Lewis | B05B 7/066 | 239/296 |
| 2008/0290102 A1 * | 11/2008 | Mangano | A47G 19/2205 | 220/703 |
| 2009/0114684 A1 * | 5/2009 | Helmenstein | B05C 17/005 | 222/541.9 |
| 2010/0040751 A1 * | 2/2010 | Yamada | A23F 3/163 | 426/474 |
| 2010/0260914 A1 * | 10/2010 | Seta | A23L 2/54 | 426/477 |
| 2015/0201794 A1 * | 7/2015 | Hoffmann | A23L 2/54 | 261/30 |
| 2016/0238305 A1 * | 8/2016 | An | F25D 23/12 | |
| 2018/0036691 A1 * | 2/2018 | Tatarek | F16K 21/06 | |
| 2020/0139312 A1 * | 5/2020 | Belcher | B01F 23/237611 | |
| 2022/0295832 A1 * | 9/2022 | Belcher | B01F 23/23611 | |

OTHER PUBLICATIONS

Written Opinion of the International Searching Authority, dated Oct. 17, 2019.
PCT/US2019/047111 Search History dated Sep. 29, 2019.

* cited by examiner

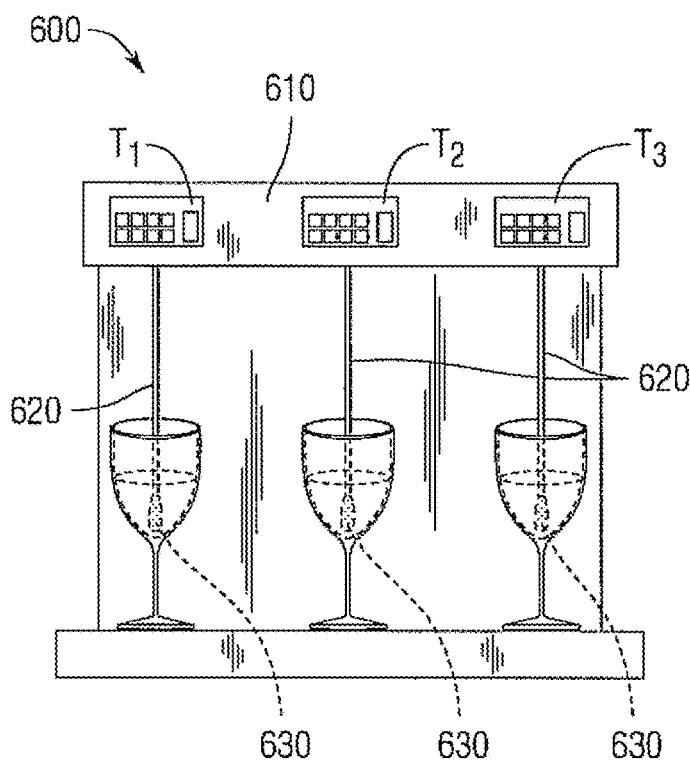
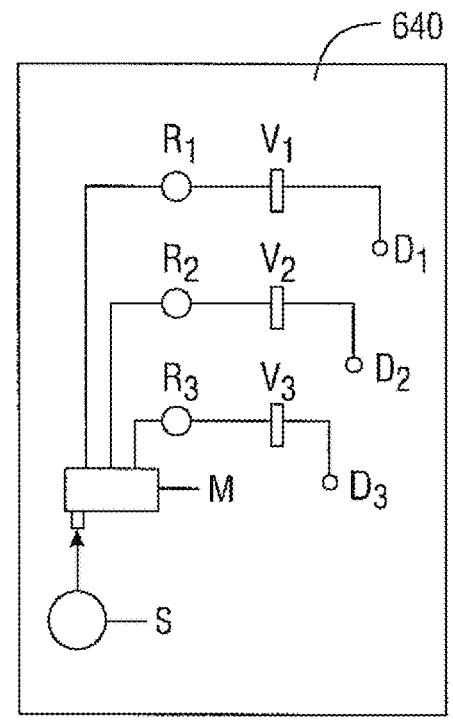
*Fig.6A*  *Fig.6B*
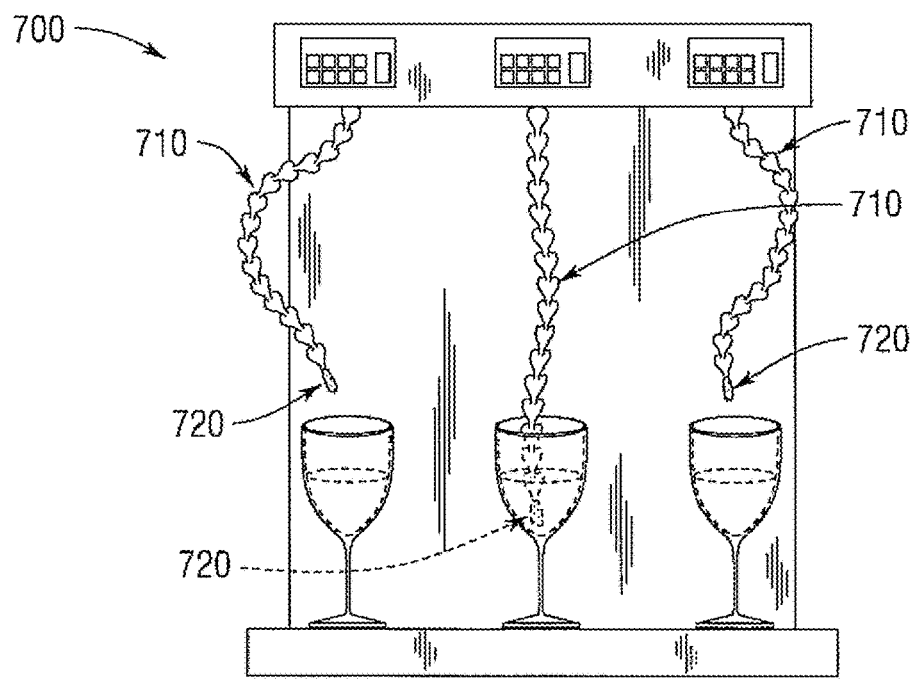
*Fig.7*

GAS DISPENSING METHOD AND APPARATUS

This application is a continuation in part of U.S. Ser. No. 13/091,477 filed Apr. 21, 2011, which claims the benefit of U.S. Provisional Application No. 61/326,324 filed Apr. 21, 2010.

Historically, wine decanting was a process to filter out sediment left in the wine bottle after aging, and mixing air into the wine to enhance its taste. As used here, decanting will be defined as a process to aerate or-more specifically, increase the dissolved oxygen concentration in wine or other liquids. In order for wine to reach its optimum drinking potential, typically one allows the wine to "breathe" which means expose the wine to air, preferably for a number of hours. Traditionally this has been done by uncorking a bottle and pouring the wine into another vessel which has a widened body so that a greater surface area of wine is exposed to the air. Exposure to air helps break up and dispel the concentrated gasses present in the wine which have been kept from exposure to air up until the point that the bottle is opened. The decanting process increases the dissolved oxygen level in the wine and is generally recognized to improve flavors and balancing on the palate by increasing depth and complexity of the wine's undertone flavors as well as softening harsh tannins and opening up its aromatics.

The accompanying drawings, which are incorporated in and constitute a part of the specification, illustrate various example systems, methods, and so on that illustrates various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DESCRIPTION OF DRAWINGS

FIGS. 6a and 6b is a diagrammatic and schematic view of an example commercial decanting system in use, respectively.

FIG. 7 is a diagrammatic view of an example decanting system in use.

DETAILED DESCRIPTION

Figures 1, 2:
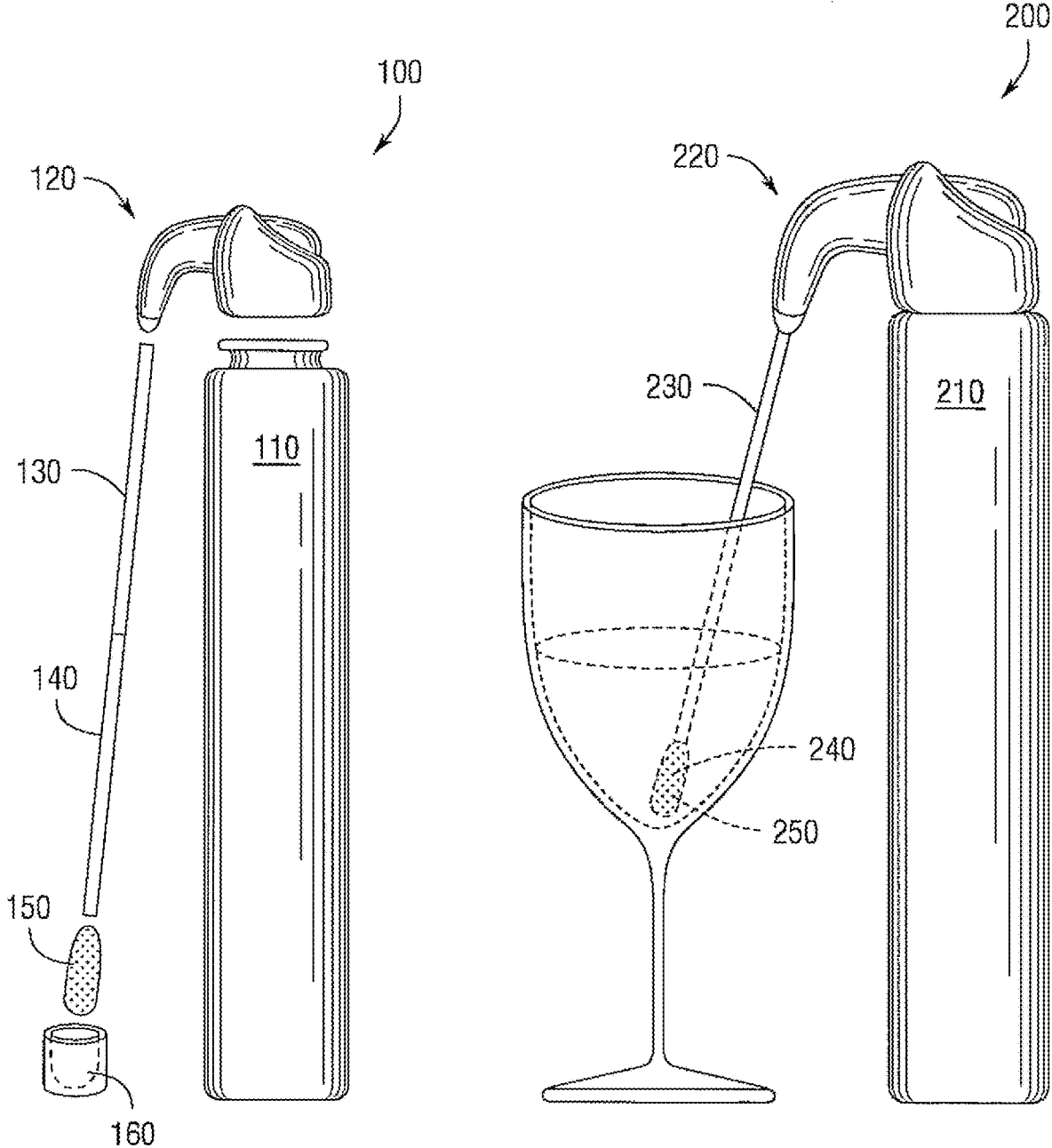
FIG. 1 is a perspective view of an example decanter.
FIG. 2 is a perspective view of an example decanter in use.

With reference to FIG. 1, a perspective view of a hand held decanter, 100, includes vessel 110 containing pressurized oxygen, oxygen enriched air, or air (hereafter "gas"). A dispenser device 120 is shown as being attached to the top end of the vessel 110 and able to selectively dispense contents of the vessel 110 through an adapter tube 130, a second adapter tube 140, and a fine bubble diffuser dispersion nozzle 150. The second adapter tube 140 may be needed when the decanter is used with a beverage that is in a bottle. Dispenser 120 may attach to the vessel 110 by press fit through a frictional fit or machine threads to screw into the vessel 110. An adapter tube 130 may connect to the dispenser 120 and a second adapter tube 140 by press fit through a frictional fit or machine threads to screw into dispenser 120 and adapter tube 140. A second adapter tube 140, if desired, may be attached by screw or frictional fit into an adapter tube 130 and a fine bubble diffuser 150. The fine bubble diffuser or dispersion nozzle 150 may include one or more holes through which the contents in vessel 110 are directed into a liquid such as an opened glass or bottle of wine or spirits (not shown) or other non-alcoholic beverage. Nozzle cap 160 may snap or screw on to the fine bubble diffuser 150 to prevent dripping or leaking of wine or spirits or other beverages after usage.

With reference to FIG. 2, a hand held decanter 200 depicted includes vessel 210 containing gas. A dispenser device 220 is shown as being attached to the top end of the vessel 210 and able to control dispersion of the contents of the vessel 210 through an adapter tube 230, and a dispersion nozzle 240. Dispenser 220 attaches to the vessel 210 by press fit through a frictional fit or machine threads. An adapter tube 230 may be connected to a dispenser 220 and a dispersion nozzle, which may be a fine bubble diffuser 240 where a path of gas or fluid communication is established between vessel 210 and dispersion nozzle 240. The dispersion nozzle 240 may include one or more holes 250 through which the contents of vessel 210 may be directed into a glass of wine or spirits, or other non-alcoholic beverage.

Figure 3:
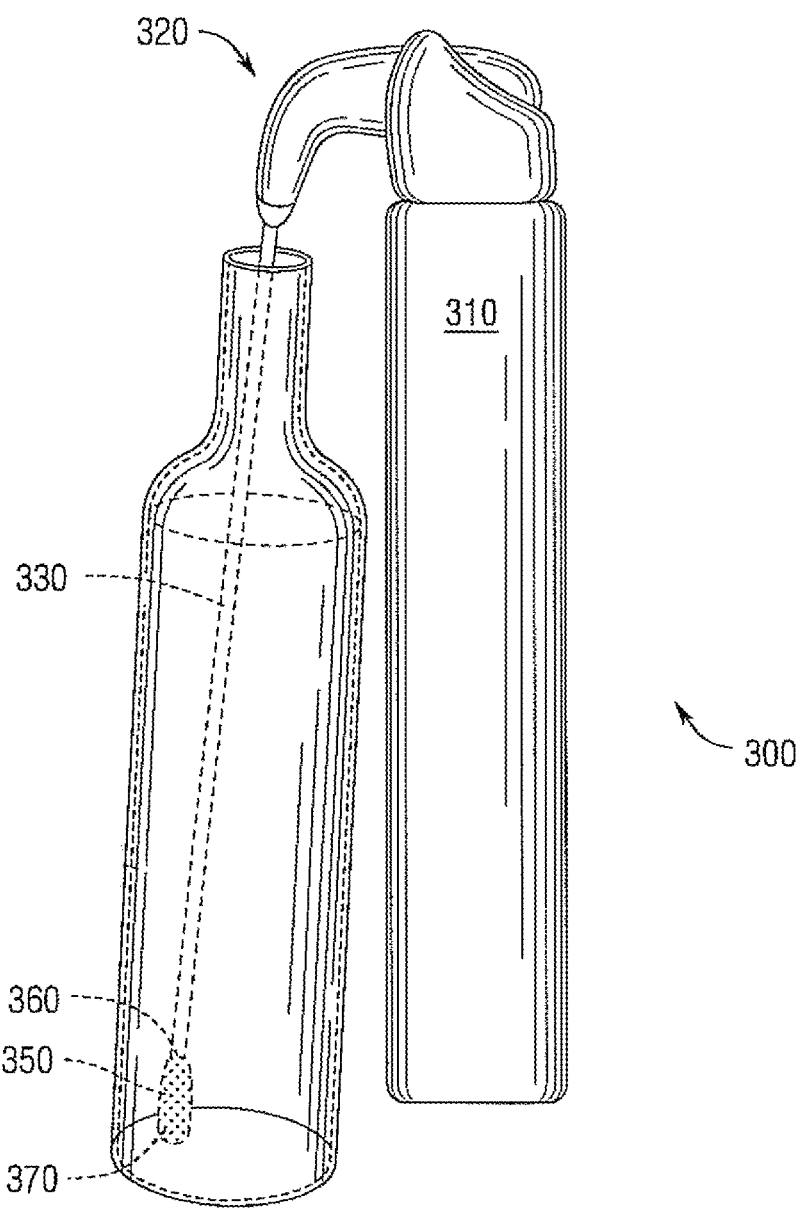
FIG. 3 is a perspective view of an example decanter in use.

With reference to FIG. 3, a hand held decanter 300 includes vessel 310 containing gas. A dispenser device 320 is shown as being attached to the top end of the vessel 310 and able to control passage of the contents from the vessel 310. Dispenser 320 connects to the vessel 310 and establishes a pathway for contents to be released from vessel 310. An adapter tube 330 connects to the dispenser 320 which in turn connects to the fine bubble diffuser 350. The fine bubble diffuser dispersion nozzle 350 defines a path from a proximal end 360 of adapter tube 330 to a plurality of holes 370.

Figure 4:
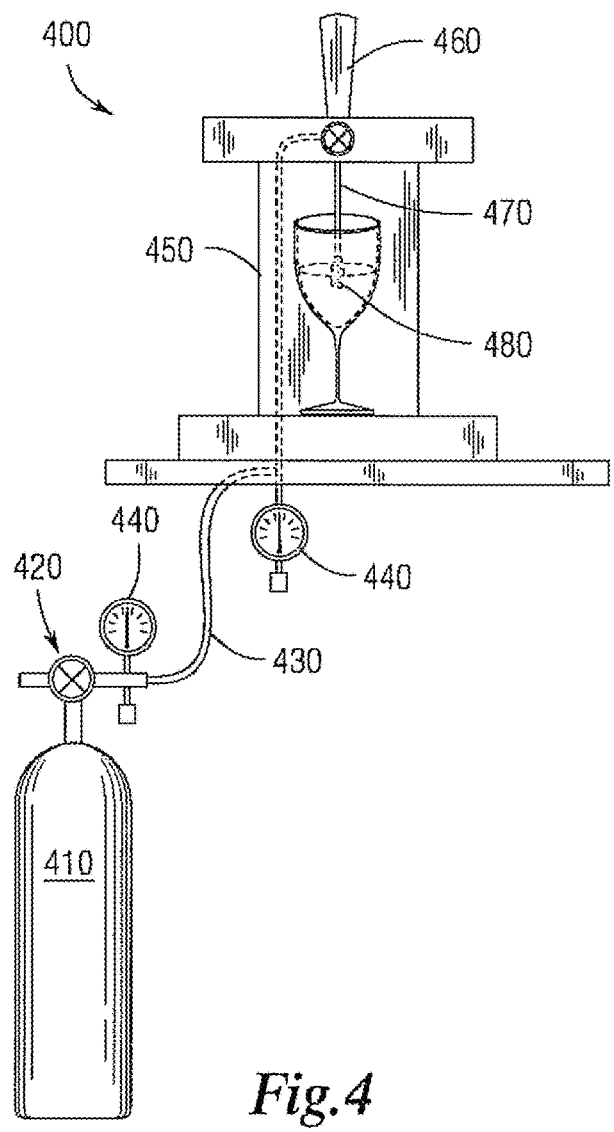
FIG. 4 is a diagrammatic view of an example commercial decanting system in use.

With reference to FIG. 4, a commercial tap dispensing decanter 400 is depicted including a tank 410 containing gas. An on/off valve 420 is shown as being attached to the top of tank 410. Tubing or hose 430 is shown connecting the on/off valve 420 to pressure regulators 440, decanter dispensing tap housing 450, and decanter dispensing tap handle 460. Housing 450 is shown to enclose the adapter tube 470 and allow the system to sit out in the open for use in a commercial setting such as, but not limited to, a bar, tavern, or wine tasting room. A tap handle on/off valve 460 is shown penetrating the top of the housing 450. When the tap handle 460 is turned to the "on" position, pressurized gas is delivered from the tank 410 through the adapter tube 470, the diffuser nozzle 480 and preferably, into a liquid to be decanted.

Figure 5:
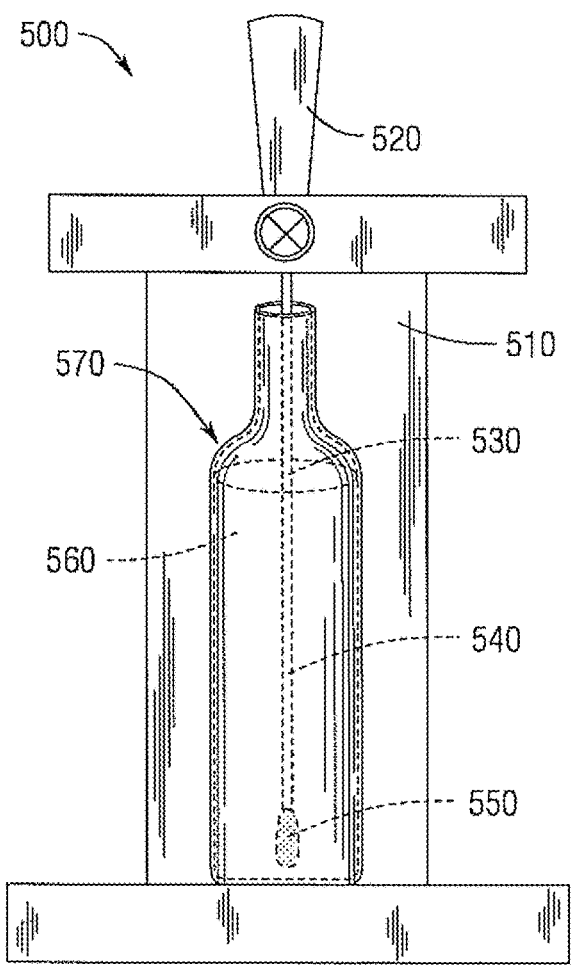
FIG. 5 is a front perspective view of an example commercial decanting system in use.

With reference to FIG. 5, a commercial tap dispensing decanter 500 is depicted including a housing 510 shown to enclose the adapter tube 530 and allow the system to sit out in the open for use in a commercial setting such as, but not limited to, a bar, tavern, or wine tasting room. A tap handle on/off valve 520 may be turned to the "on" position to provide gas into a beverage 560 such as wine or spirits through the adapter tube 530, a second adapter tube 540 if necessary, and the diffuser nozzle 550.

With reference to FIG. 6a, an exemplary decanter 600 including touchpad 610 is depicted. The touchpad 610 allows a user to program the length of time the gas is dispensed based on the volume to be oxygenated or decanted and the particular liquid to be decanted. When activated, the gas flows through an adapter tube 620 and into the liquid through nozzle 630.

With reference to FIG. 6b, a simplified schematic diagram 640 for the touchpad unit 610 includes individual valves, V1, V2, and V3 each controlled by an associated touchpad T1, T2, and T3, respectively. A common gas source Sis connected to each valve V through a distribution manifold M in communication with a set of regulators R1, R2, and R3. D1, D2, and D3 refer to the dispensers associated with each touchpad T1, T2, and T3, respectively.

With reference to FIG. 7, a commercial decanter 700 depicted using exemplary "Loc-Line" type non-metallic adjustable tubes 710 to direct gas through a nozzle 720. Other conduit or paths may be used to carry the gas from a source (not shown) to an end nozzle 720 without loss of functionality.

Figure 8:
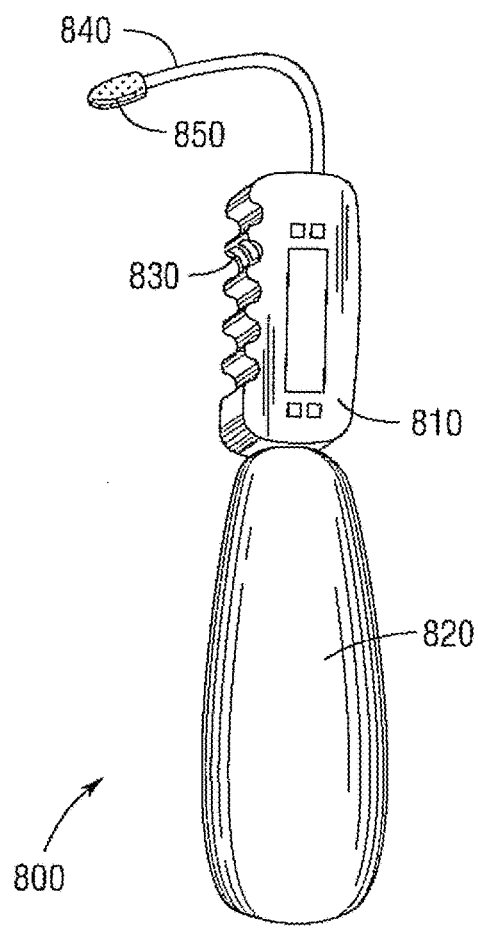
FIG. 8 is a perspective view of an example decanter.

With reference to FIG. 8, a hand held decanter 800 is depicted with a programmable dispensing mechanism 810 wherein one can program a set amount of gas to be dispersed or a set amount of time for the gas to flow. This may also be accomplished through the use of a "metered valve," operable to dispense a set amount of gas when the button is pressed as opposed to the alternate can that dispenses as Jong as the button is held down. The use of this type of metered valve dispenser can may be used in the other configurations without loss of functionality. Alternate or additional controls may be provided to vary the dispersion based on gas to be injected, vessel size to be decanted, or particular liquid to be decanted. The programmable dispensing mechanism 810 is attached to a vessel containing gas 820. A finger trigger 830 activates the programmable dispensing mechanism 810. When activated, gas flows from vessel 820, through the dispensing mechanism 810, through adapter tubing or hose 840 and out through a nozzle 850.

Figure 9A:
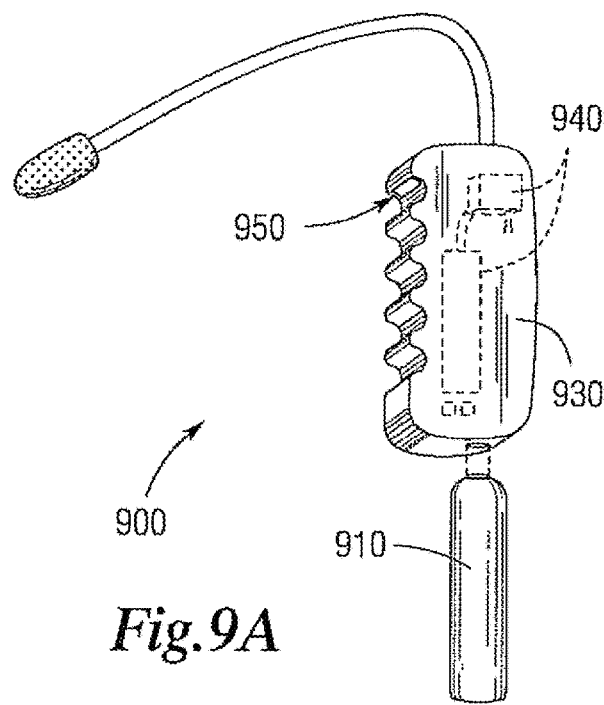
FIGS. 9a and 9b are a perspective view of an example decanter including various sized "gas" cartridges.
Figure 9B:
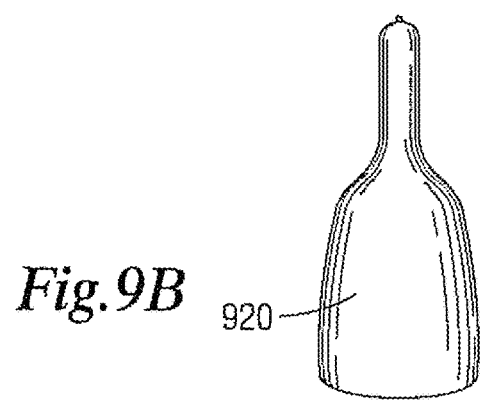

With reference to FIGS. 9a and 9b, a hand held metered distribution decanter 900 is shown with varying sizes of compact cartridges such as cartridge 910 shown in FIG. 9a and a larger cartridge 920 shown in FIG. 9b which can be inserted into or attached to the handle of the device 930. The metered distribution decanter contains a duration regulator 940 which controls the volume of a gas, such as oxygen being delivered. A finger trigger 950 or other suitable user control may be used to activate the metered distribution decanter.

Figure 10A:
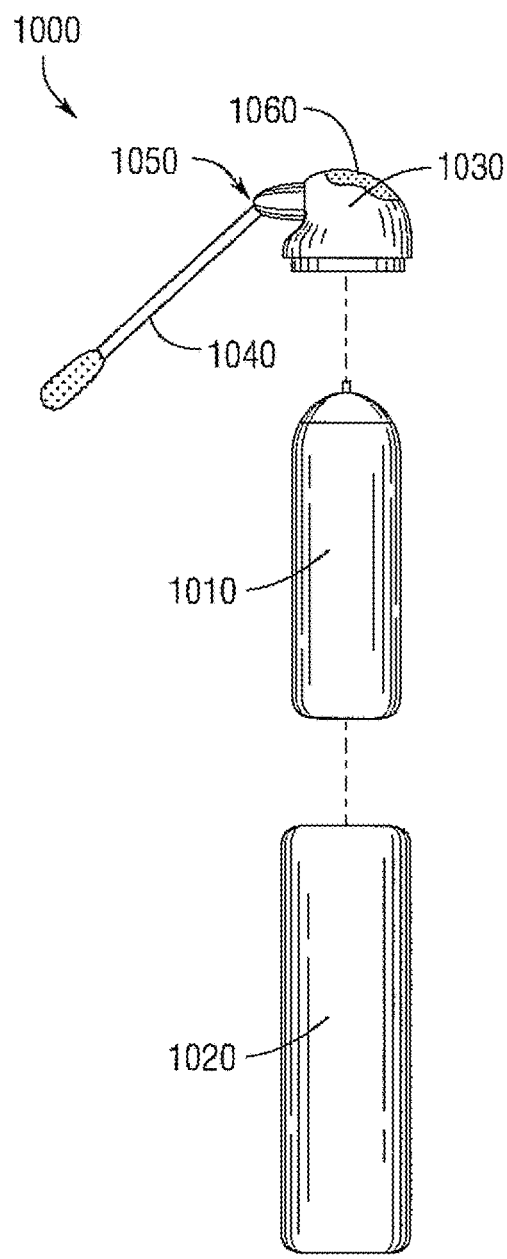
FIGS. 10a-10c are an exploded side perspective, a side perspective view, and a top plan form view of an example decanter, respectively.

With reference to FIG. 10a, an exploded view of hand held decanter 1000 may include a compact cartridge 1010 containing gas which fits inside an exterior housing 1020. A dispensing device 1030 with male threads may be screwed onto the exterior housing 1020 female threads or vice versa. An adapter tube 1040 is shown exiting the dispensing device 1030 by a hinged connector 1050 which allows the adapter to swivel more or less than 90°.

Figure 10B:

With reference to FIG. 10b, a side, plan view of a hand held decanter 1000 is shown. The decanter 1000 includes housing 1020 containing a source of gas (not shown) both connected to dispensing device 1030. Dispensing device 1030 includes a user activated press button 1060 or other mechanism to selectively permit gas to travel through angularly positionable adapter 1040. The angle of rotation for the adapter 1040 is shown as a.

Figure 10C:
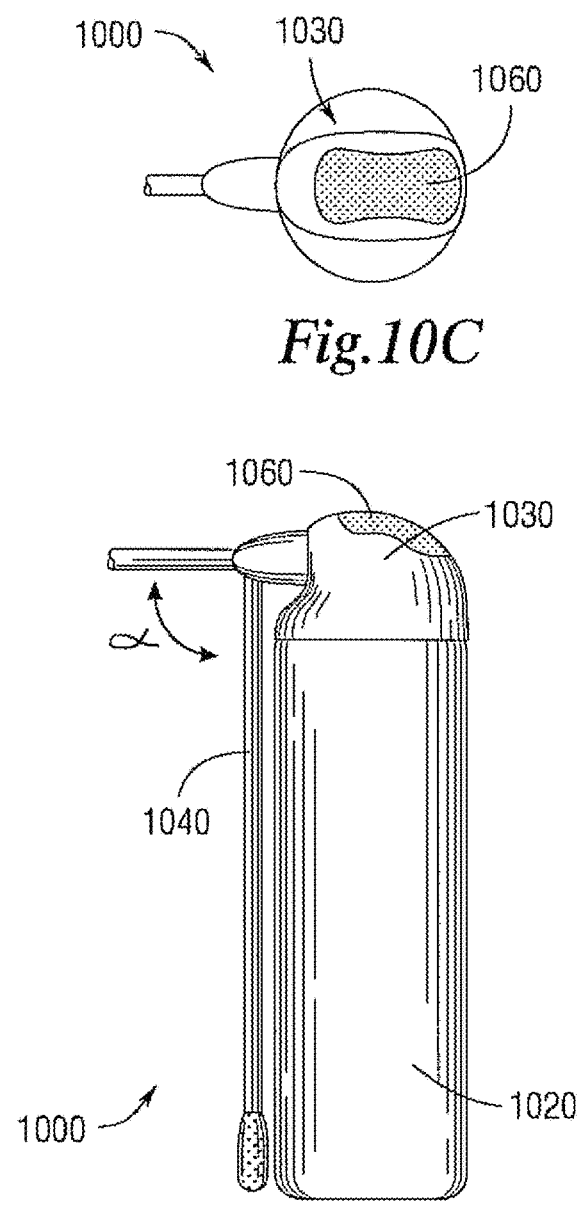

With reference to FIG. 10c, a top view of a hand held decanter 1000 is shown including dispensing device 1030 and press button 1060.

Figure 11:
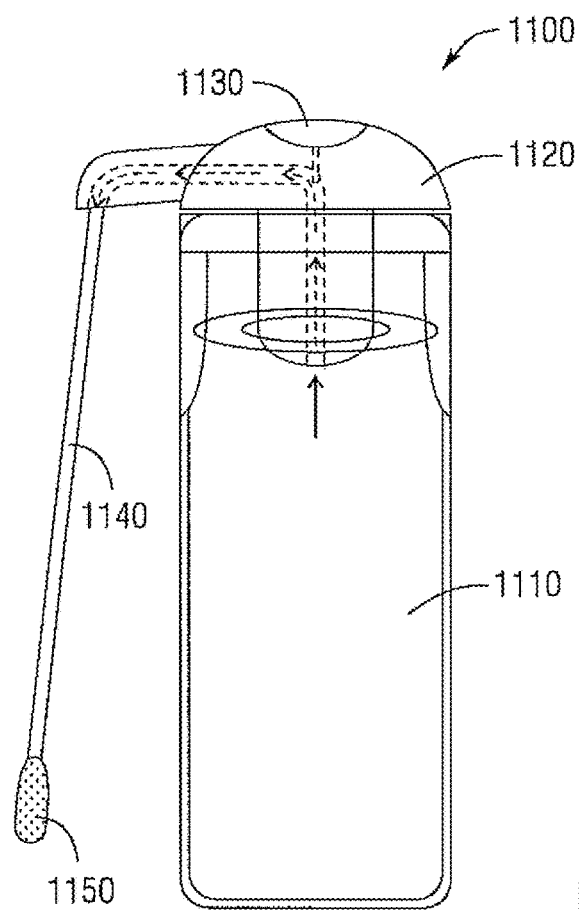
FIG. 11 is a cut away perspective view of an example decanter.

With reference to FIG. 11, a hand held decanter 1100 may include a pressure pump vessel device 1110 with top 1120. In one embodiment when the top 1120 is pumped up and down by hand, the vessel 1110 is pressurized with air. The air may be released by activating trigger 1130. This embodiment allows maximization of air decanting by dispersing the air through the adapter tube 1140 and the fine bubble nozzle 1150 and exposing the air to a greater surface area of the wine or spirits or other beverage.

Figure 12:
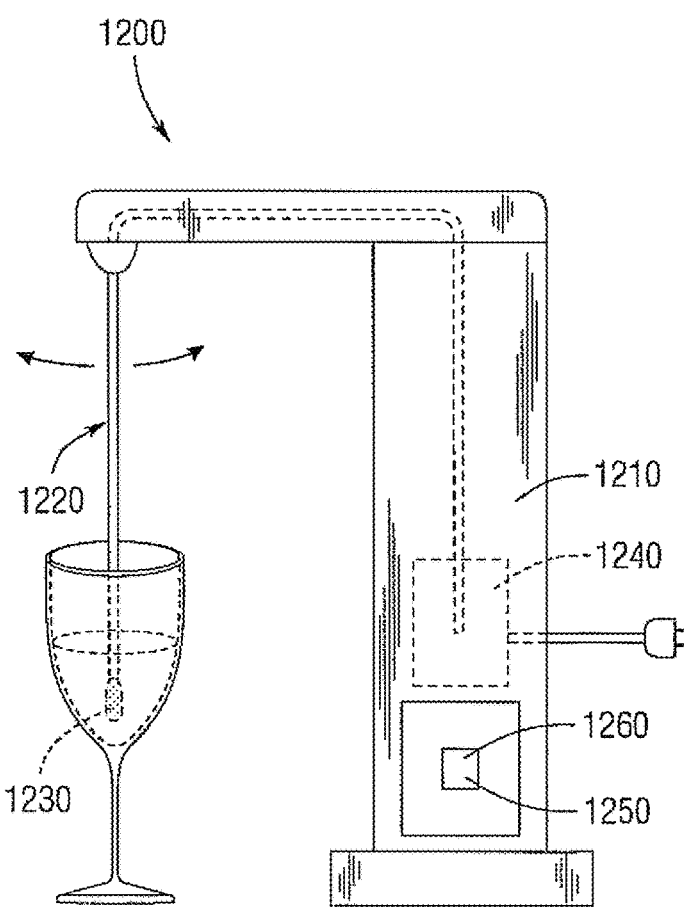
FIG. 12 is a perspective view and functional block diagram of an example decanter.

With reference to FIG. 12, a commercial tap dispensing decanter 1200 may include housing 1210, an adapter tube 1220, and a diffuser 1230. A diaphragm or other air pump 1240 is shown as being electrically powered, but in an alternate embodiment, it may be battery operated. Air is pumped into the system by the air pump 1240 and a predetermined amount of air is directed into the liquid through the adapter tube 1220, and the diffuser 1230 by selecting "on" on the on/off button 1250. The volume of air released or the amount of time the air is released may be programmed using a timer button 1260 or other programmable mechanisms.

Figure 13:
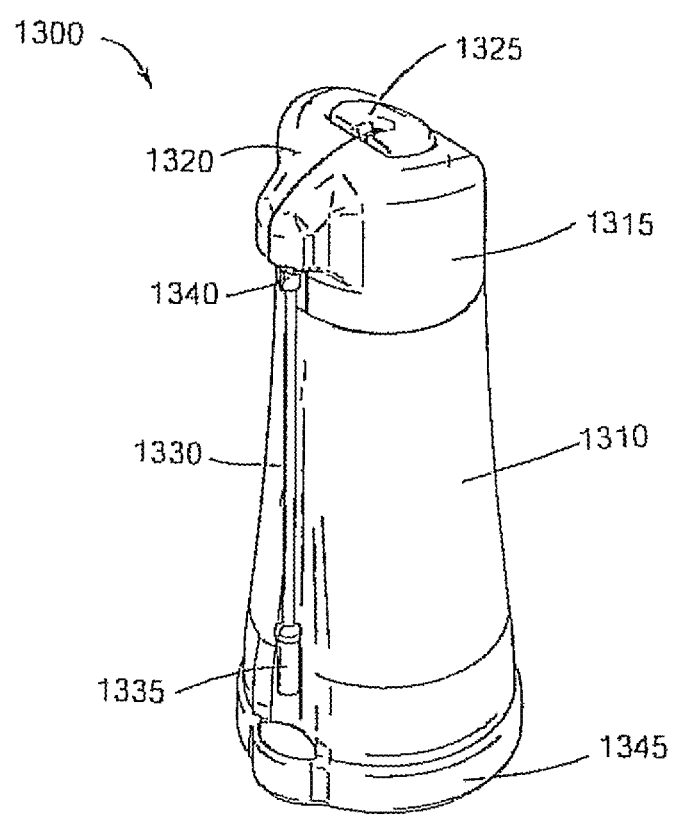
FIG. 13 is a perspective view of an example decanter.

With reference to FIG. 13, a hand held decanter 1300 may include a vessel 1310 attached to a dispensing device with top cap components 1315 and 1320 and push button 1325. By pushing press button 1325, the gas contents of vessel 1310 may be dispensed through an adapter 1330 and out through a nozzle 1335 on its second, distal end. The adapter 1330 may be stored adjacent the body of vessel 1310 when not in use, but may rotate along its swivel wheel 1340 more or less than 90° when in use. A bottom cover 1345 may provide stability and include a compartment for collecting drops of liquid from the nozzle 1335 after use.

Figure 14:
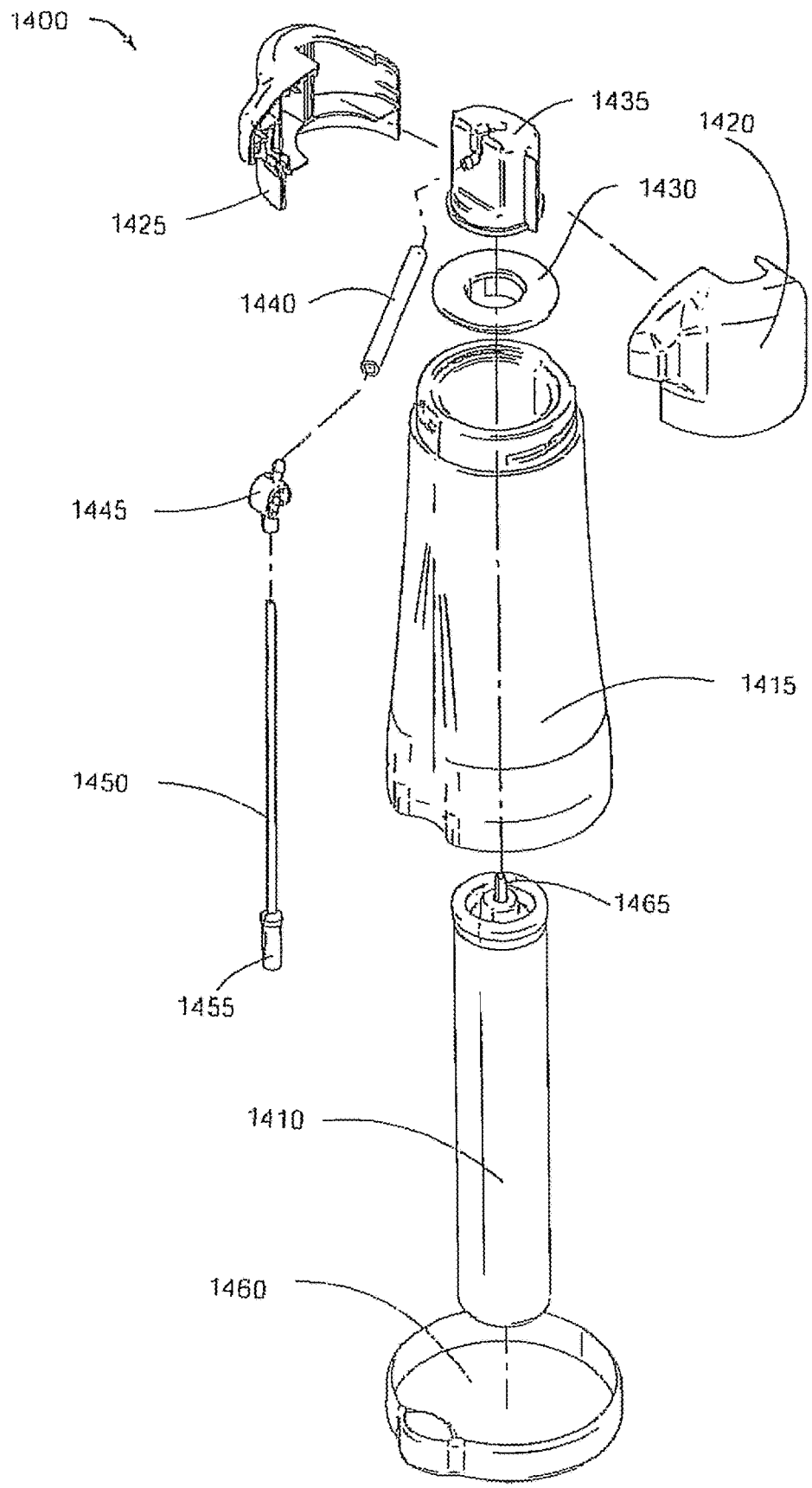
FIG. 14 is an exploded view of an example decanter.

With reference to FIG. 14, an exploded view of decanter 1400 may include a compact pressurized gas cartridge vessel 1410 supportedly surrounded by housing 1415. The vessel 1410 contains substantially only pressurized gas. As used here, "substantially only" means the vessel 1410 containing a gas, with no or trace amounts only of other liquid or solid, and no additional mechanical components such as a dip tube or a ball bearing. Connected to the housing 1415 by press fit through a frictional fit or machine threads may be a dispensing device with top cap sections 1420 and 1425, snap ring 1430, and components making up a dispensing mechanism comprising a press button 1435, air tube 1440 and swivel 1445 wherein the dispensing mechanism selectively releases contents of the vessel 1410 while preventing escape of the gas from the vessel 1410 when not in use. An adapter 1450 may have a first, proximal end and a second distal end with a path for fluid communication there between. The first, proximal end may be connected to the dispensing mechanism to selectively receive an amount of pressurized gas. A nozzle 1455 may be at a second, distal end and in fluid communication with the adapter 1450. When the adapter 1450 is in a stored position, it may rest adjacent to the body of the housing 1415. However when in use, the adapter may rotate along a swivel 1445 more or less than 90° relative to the housing 1415. Bottom cover 1460 may also be used to improve stability when placed on a surface and to collect any remaining liquid that may drop from the nozzle after use. In use, push button 1435 is depressed causing vessel tube 1465 to be pushed down into the vessel 1410 forming a passageway allowing release of the gas through the dispensing mechanism and adapter 1450 and out through the nozzle 1455.

Figure 15:
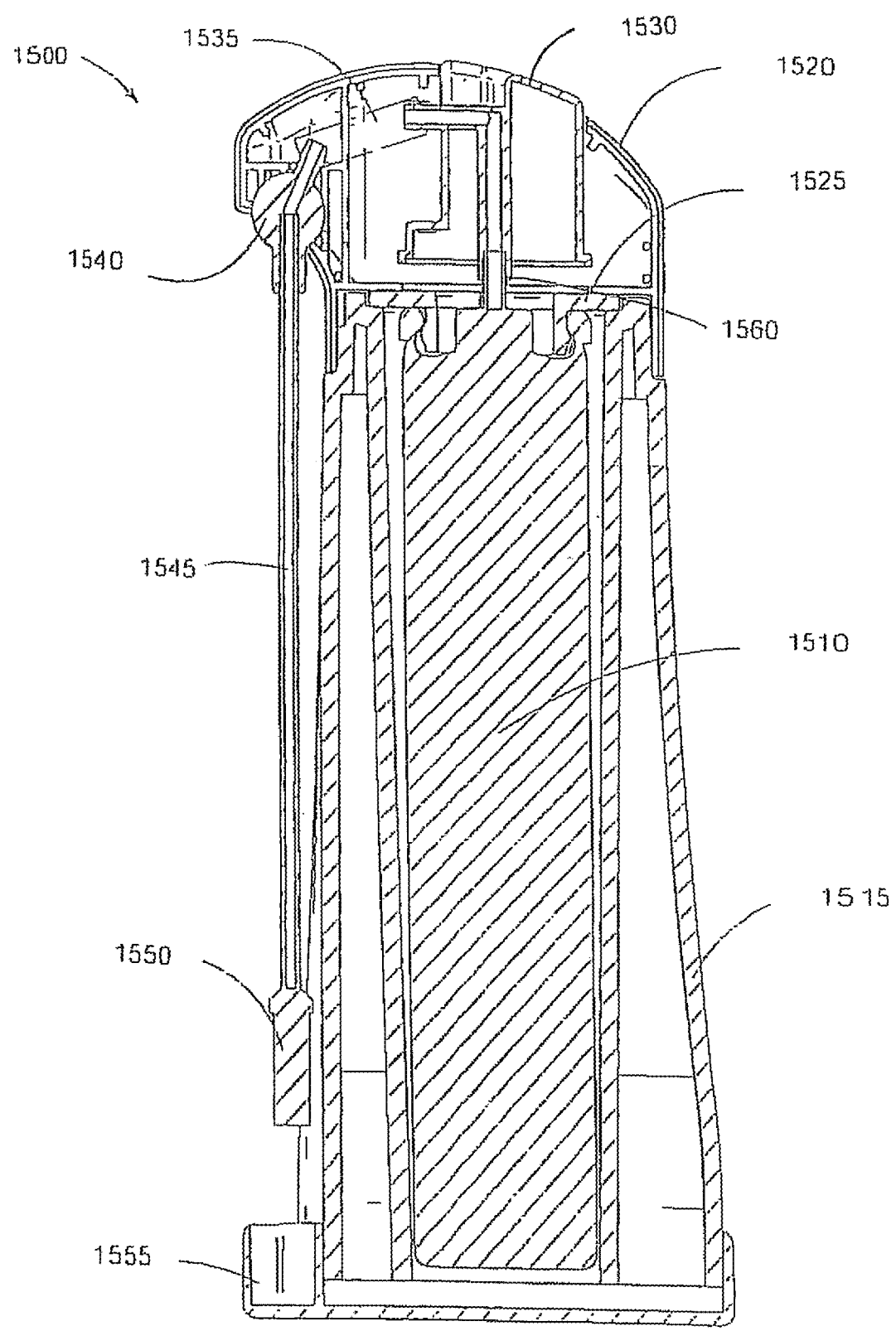
FIG. 15 is a cross sectional view of an example decanter.

With reference to FIG. 15, a cross sectional view is shown for a hand held decanter 1500 which may include a pressurized gas cartridge vessel 1510 that is supportedly surrounded by housing 1515. A dispensing device may include top cap section 1520, snap ring 1525 and dispensing mechanism components such as press button 1530, air tube 1535, and swivel 1540. An adapter 1545 with nozzle 1550 on its distal end is shown in its stored position alongside the housing 1515. Bottom cover 1555 is also shown encircling the lower portion of the housing. As depicted, when the decanter 1500 is not in use, the press button 1530 is in a position slightly above the vessel 1510, such that the vessel tube 1560 does not penetrate far enough into the vessel 1510 to form a path for fluid communication, thus preventing escape of the gas. However, in use, the adapter 1545 may be rotated away from the housing 1515 more or less than 90° along swivel 1540 so that nozzle 1550 may be placed into a glass of wine or other beverage. When the press button 1530 is depressed or activated, a portion of the button 1530 moves down into vessel tube 1560 pushing vessel tube 1560 further down into vessel 1510 forming a path for fluid communication, permitting release of the gas from the vessel 1510, through the dispensing mechanism and adapter 1545, and out through the nozzle 1550 into the wine or beverage.

Figure 16:
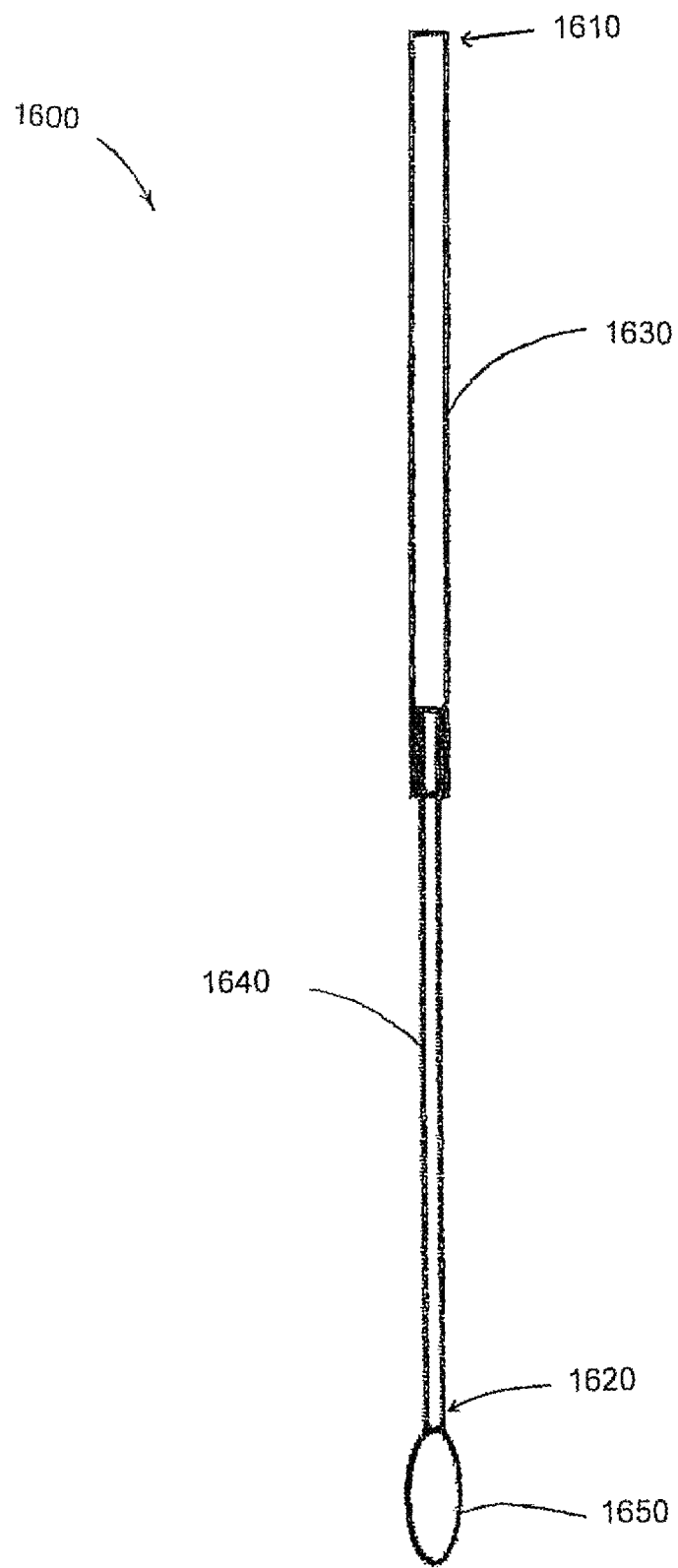
FIG. 16 is a perspective view of an example telescoping antenna.

With reference to FIG. 16, a perspective view of a telescoping, antenna-type adapter 1600 may include a first, proximal end 1610 and a second, distal end 1620 with a path for fluid communication therebetween and may be composed of two or more telescoping tubes. The adapter 1600 may include a larger diameter tube 1630 that slidably disposed over and configured to receive a smaller diameter tube 1640. The tubes may be retracted or extended depending on the length of the adapter desired. A nozzle 1650 may be connected to the distal end 1620 of the adapter 1600. This telescoping adapter and nozzle may be substituted for any adapter and nozzle disclosed in this application without loss of functionality.

Figure 17:
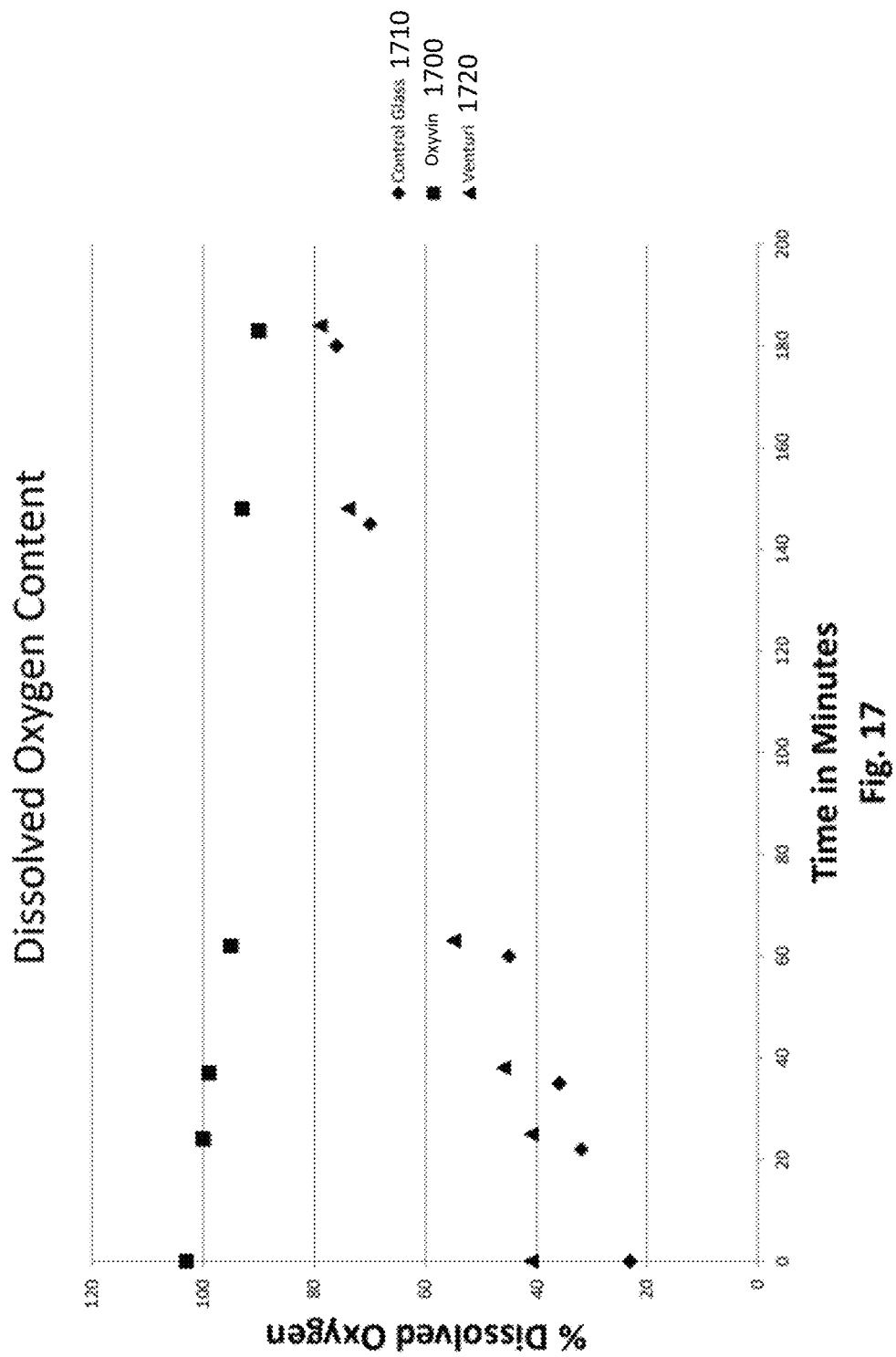
FIG. 17 is a chart of experimental data.

With reference to FIG. 17 and Table 1, preliminary comparison experiments were performed using a Milwaukee Mi605 to measure dissolved oxygen content in three glasses of a 2008 Red Truck wine including a Control Glass, a glass decanted with a proto-type hand-held decanter, and a glass poured through a venturi-type decanting device such as that sold by Vinturi, Inc. under the name Vinturi. The "y" axis labeled "% Dissolved Oxygen" depicts the percent oxygen dissolved as measured by the Mi605. The wine was directly poured out of a freshly uncorked bottle into a glass for the "Control Glass (G1)". The second glass labeled "OxyVin (G2)" was also poured directly out of the same freshly uncorked bottle and decanted using the decanter with a vessel containing 95% oxygen enriched air. For a glass of wine, one application or use of the decanter included a 0.25-3.00 second exposure to the gas. The third glass labeled "Venturi Glass (G3)" was also poured directly out of the same freshly uncorked bottle directly through the venturi device into the glass. The data are shown below in Table 1 and the initial decanter data indicate that it is possible for dissolved oxygen content to be present in excess of 100% when in a supersaturated state. FIG. 17 shows the decanter data 1700 with a very high level of dissolved oxygen initially and then slightly decreasing over time as the wine sits exposed to the atmosphere. Whereas, ambient air data 1710, and Vinturi data 1720 both show initially lower dissolved oxygen concentrations, 23% and 41% respectively. The dissolved oxygen concentrations slightly increase over time with continued exposure to the atmosphere, but level out between 76%-79%.

TABLE 1

| Minutes | Control Glass (G1) | OxyVin Glass (G2) | Venturi Glass (G3) |
|---|---|---|---|
| 0 | 23% | 103% | 41% |
| 22 | 32% | | |
| 24 | | 100% | |
| 25 | | | 41% |
| 35 | 36% | | |
| 37 | | 99% | |
| 38 | | | 46% |
| 60 | 45% | | |
| 62 | | 95% | |
| 63 | | | 55% |
| 145 | 70% | | |
| 148 | | 93% | 74% |
| 180 | 76% | | |
| 183 | | 90% | |
| 184 | | | 79% |

Figure 18:
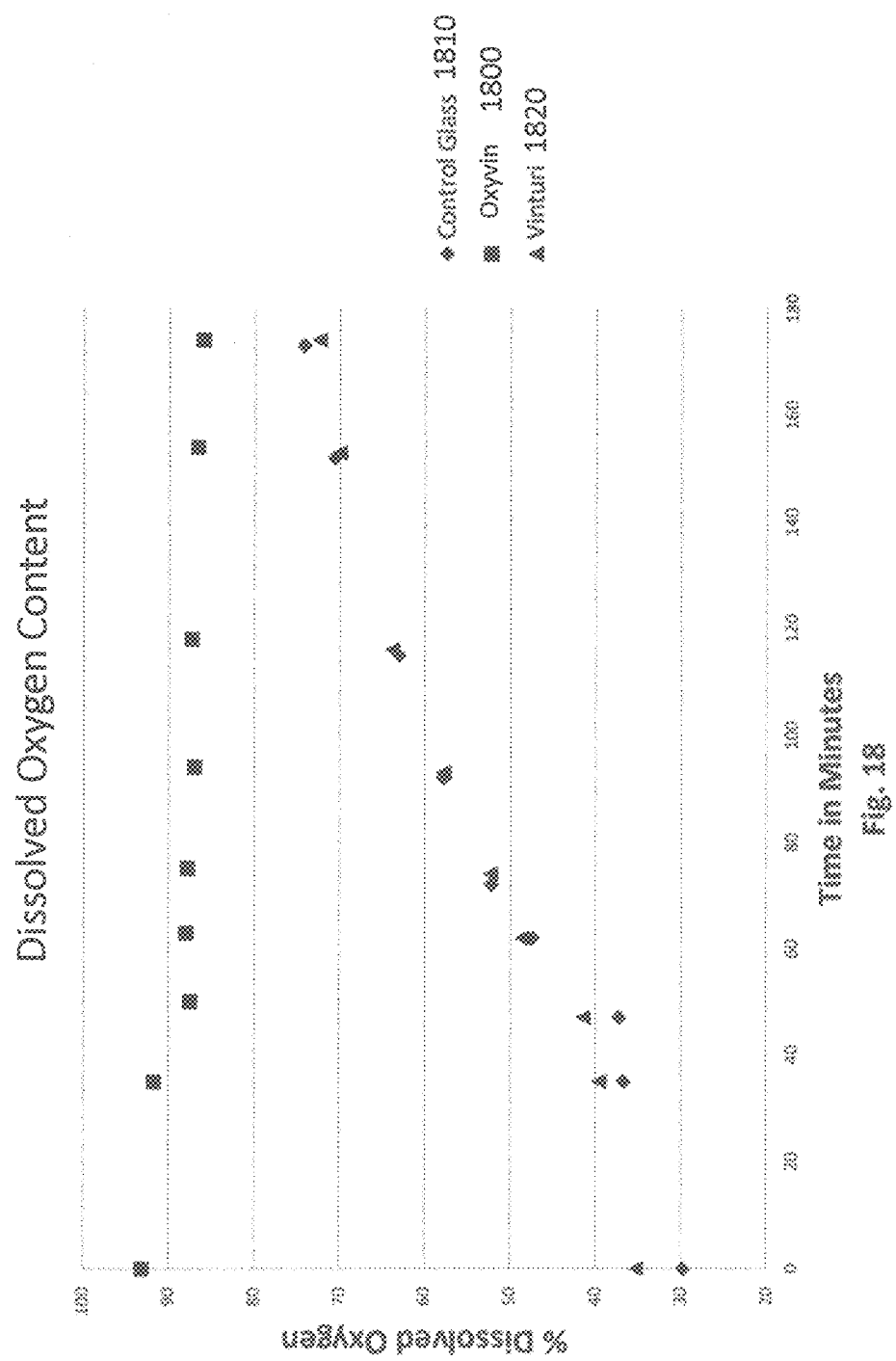
FIG. 18 is a chart of experimental data.

With reference to FIG. 18, data was collected for a 2008 Harvest Moon Pinot Noir PRV wine. The data are shown below in Table 2 and as a graph at FIG. 18 as percent dissolved oxygen as a function of time. FIG. 18 shows the decanter data 1800, again, with a very high level of dissolved oxygen initially and then slightly decreasing over time as the wine sits exposed to the atmosphere. Whereas the ambient air data 1810, and the Vinturi data 1820 show initially low dissolved oxygen concentrations, 29.9% and 35.2% respectively. The dissolved oxygen concentrations slightly increase over time with continued exposure to the atmosphere, but peak at about 72.4%-74.2%.

TABLE 2

| Minutes | Control Glass (G4) | OxyVin Glass (G5) | Venturi Glass (G6) |
|---|---|---|---|
| 0 | 29.7% | 93.1% | 35.2% |
| 3 | | | |

TABLE 2-continued

| Minutes | Control Glass (G4) | OxyVin Glass (G5) | Venturi Glass (G6) |
|---|---|---|---|
| 35 | 36.7 | 91.7% | 39.5% |
| 47 | 37.2% | | |
| 50 | | 87.5% | |
| 62 | 47.4% | | 48.6% |
| 63 | | 87.9% | |
| 72 | 52.2% | | |
| 74 | | | 52.3% |
| 75 | | 87.8% | |
| 92 | 57.8% | | |
| 93 | | | 57.8% |
| 94 | | 87% | |
| 115 | 63.1% | | |
| 116 | | | 63.8% |
| 118 | | 87.3% | |
| 152 | 70.6% | | |
| 153 | | | 70% |
| 154 | | 86.6% | |
| 173 | 74.2 | | |
| 174 | | 86% | 72.4% |

Figure 19:
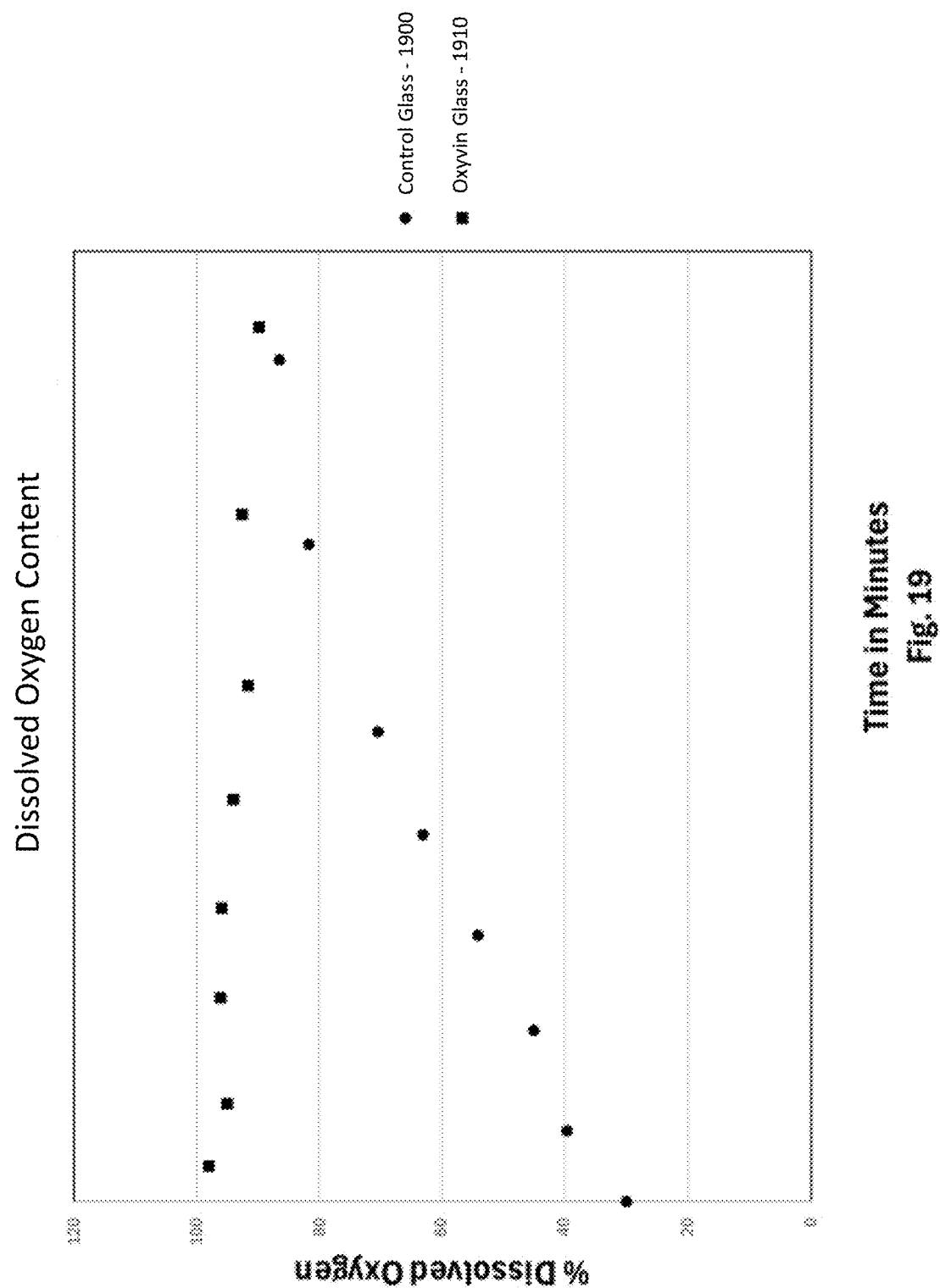
FIG. 19 is a chart of experimental data.

With reference to FIG. 19 and Tables 3a and 3b, ten varieties of wine from California, France and Italy were decanted using an exemplary decanter and compared to a control glass of the same wine that had not been decanted or exposed to anything other than ambient air. The wines used in the experiment were a California August Briggs 2007 Pinot Meunier (A), California Harvest Moon 2008 Randy Zinfandel (B), California Kokomo 2008 Pinot Noir (C), Italy Villa Cafaggio 1998 Cortaccio (D), Italy RuffinoRiservaDucale Oro 2004 Chianti Classico (E), Italy Palazzo Della Torre 2006 Veronese (F), California Retzlaff 2002 Cabernet Sauvignon (G), California Benett Lane 2005 Cabernet Sauvignon (H), France Domaine La Roqucic 2006 Chateauneuf Du Pape (I), and a California Mum Napa 2007 Chardonnay (J). In reference to Tables 3a and 3b, CG refers to control glass and all of the concentration values are in percent. All the data, including data shown in Tables 1 and 2, indicate that the wine exposed to one application with the decanter have a dissolved oxygen concentration of between 92-133.7% immediately following treatment. As the treated wines sit out in the environment, the percent dissolved oxygen slowly decreases down to between 75-89% over a five hour period. Whereas the control glasses of wine start out with low concentrations of dissolved oxygen, between 23-39%, and slowly increase while sitting out in ambient air. The data indicate that it takes several hours before the dissolved oxygen concentration of the control glass wines approach dissolved oxygen levels between 70%-86%. This is further illustrated in FIG. 19, which is a graph of the data 1900 for control glass C with low initial dissolved oxygen concentration, 29.9%, that slowly increases to 86.5% after 310 minutes. For comparison, a graph of the data 1910 for the decanted wine has a 98% dissolved $O_2$ concentration immediately that slightly decreases to 89.8% after 322 minutes. The trend shown in FIG. 19 is representative of all the data taken for the other nine wines, so individual graphs for each are not included.

TABLE 3a

| Time (minutes) | CG A | OxyVin A | CG B | OxyVin B | CG C | OxyVin C | CG D | OxyVin D | CG E | OxyVin E |
|---|---|---|---|---|---|---|---|---|---|---|
| 0 | 39 | | 33.7 | | 29.9 | | 34.1 | | 38.9 | |
| 13 | | 93.4 | | 123.9 | | 98 | | 92 | | 133.7 |
| 26 | 42 | | 40.6 | | 39.6 | | 37.3 | | 41 | |
| 36 | | 91.7 | | 118.6 | | 95 | | 88.2 | | 124.3 |
| 63 | 46.9 | | 47.2 | | 45 | | 39.7 | | 44.8 | |
| 75 | | 87 | | 114 | | 96.1 | | 84.1 | | 111.9 |
| 98 | 53.4 | | 54.5 | | 54.1 | | 41.3 | | 52.2 | |
| 108 | | 87 | | 106.3 | | 95.9 | | 79.5 | | 105 |
| 135 | 57.4 | | 62.4 | | 63.1 | | 45.7 | | 60.3 | |
| 148 | | 85 | | 100 | | 94 | | 77 | | 98.2 |
| 173 | 63.4 | | 69.5 | | 70.4 | | 53.8 | | 67.3 | |
| 190 | | 86.5 | | 98.5 | | 91.6 | | 77 | | 94.8 |
| 242 | 74.7 | | 79.7 | | 81.7 | | 64.6 | | 77.2 | |
| 253 | | 89.3 | | 96.3 | | 92.6 | | 77.4 | | 90.4 |
| 310 | 81.6 | | 85.5 | | 86.5 | | 70.9 | | 80.6 | |
| 322 | | 86.7 | | 92.4 | | 89.8 | | 75.4 | | 88.7 |

TABLE 3b

| Time (minutes) | CG F | OxyVin F | CG G | OxyVin G | CG H | OxyVin H | CG I | OxyVin I | CG J | OxyVin J |
|---|---|---|---|---|---|---|---|---|---|---|
| 0 | 31.8 | | 29.3 | | 26.7 | | 25.4 | | 28.2 | |
| 13 | | 124.8 | | 112.1 | | 110.8 | | 107.3 | | 95.3 |
| 26 | 40.7 | | 33.9 | | 32.8 | | 29.3 | | 36.8 | |
| 36 | | 117.2 | | 105.3 | | 105.1 | | 99.7 | | 89.7 |
| 63 | 46.7 | | 40.3 | | 39.8 | | 35.9 | | 43.1 | |
| 75 | | 108.6 | | 99.2 | | 98.2 | | 92.7 | | 83.7 |
| 98 | 56.3 | | 48.7 | | 50.8 | | 43.7 | | 49.2 | |
| 108 | | 102.2 | | 96.5 | | 95.1 | | 90.1 | | 83.9 |
| 135 | 63.7 | | 58 | | 58.9 | | 53 | | 59.2 | |
| 148 | | 95.7 | | 92.3 | | 92.1 | | 88.7 | | 85.7 |
| 173 | 71.2 | | 66.3 | | 66.3 | | 61.5 | | 68.2 | |
| 190 | | 94.4 | | 91.7 | | 89.7 | | 89.5 | | 88.1 |
| 242 | 77.6 | | 76.2 | | 76.5 | | 73.1 | | 79.9 | |
| 253 | | 91.1 | | 91.3 | | 90.4 | | 91.3 | | 91.5 |

TABLE 3b-continued

| Time (minutes) | CG F | OxyVin F | CG G | OxyVin G | CG H | OxyVin H | CG I | OxyVin I | CG J | OxyVin J |
|---|---|---|---|---|---|---|---|---|---|---|
| 310 | 80 |  | 79.8 |  | 79.9 |  | 77.7 |  | 83.4 |  |
| 322 |  | 88.5 |  | 88.9 |  | 87.4 |  | 88.3 |  | 89.8 |

Figure 20:
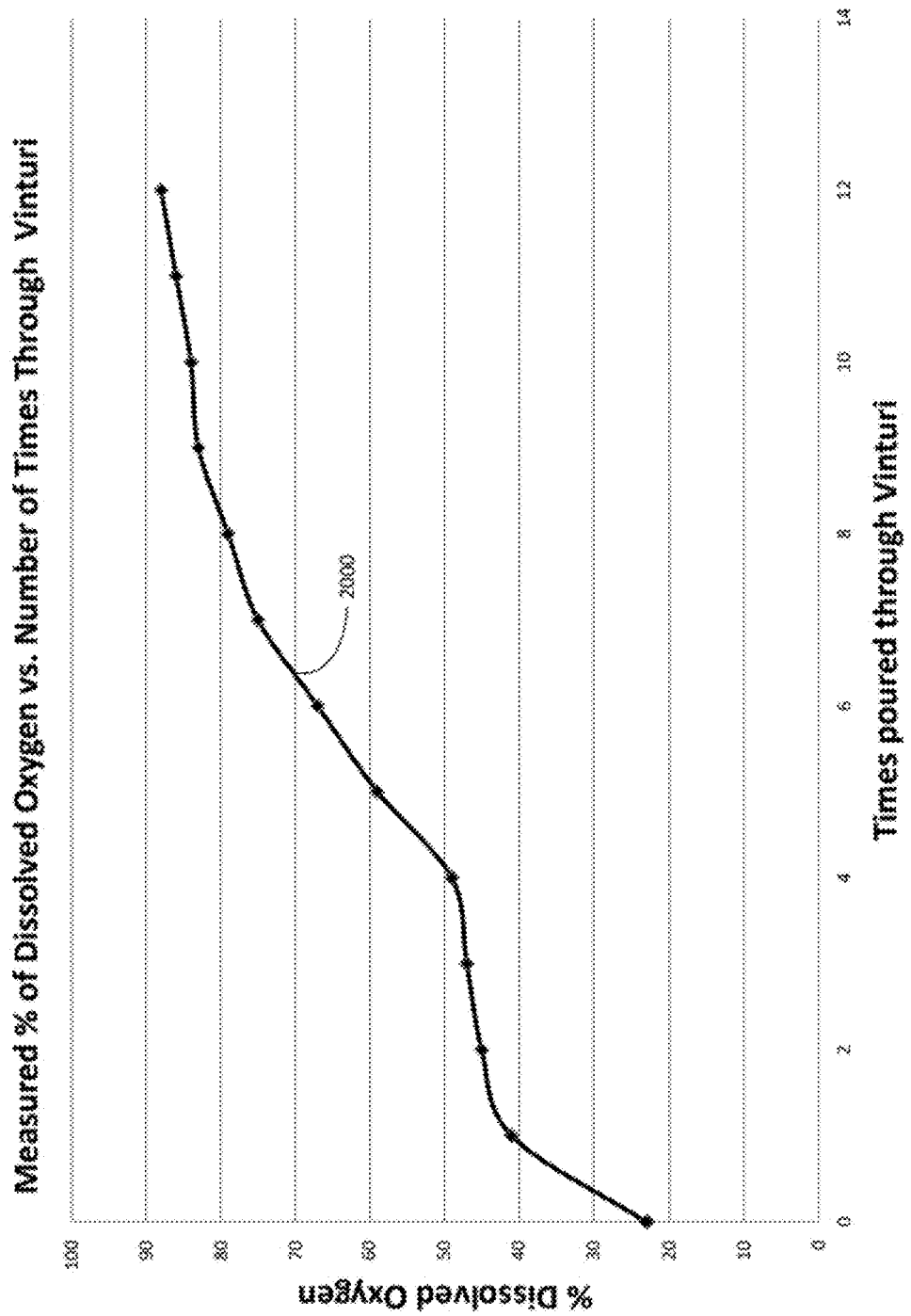
FIG. 20 is a chart of experimental data.

With reference to FIG. 20 and Table 4, additional experimental results show the effort needed to reach relatively high levels of dissolved oxygen using just a venturi-type device. A single glass (G7) of 2008 Red Truck wine was repeatedly poured through a venturi device twelve times with the dissolved oxygen measured after each pour. As is apparent from Table 4, nine pours through the venturi-type device is required to achieve dissolved oxygen levels greater than 80%. This data is also illustrated as 2000 in FIG. 20.

TABLE 4

| Venturi Glass G7 | % DO |
|---|---|
| ×0 | 23% |
| ×1 | 41% |
| ×2 | 45% |
| ×3 | 47% |
| ×4 | 49% |
| ×5 | 59% |
| ×6 | 67% |
| ×7 | 75% |
| ×8 | 79% |
| ×9 | 83% |
| ×10 | 84% |
| ×11 | 86% |
| ×12 | 88% |

Figure 21:
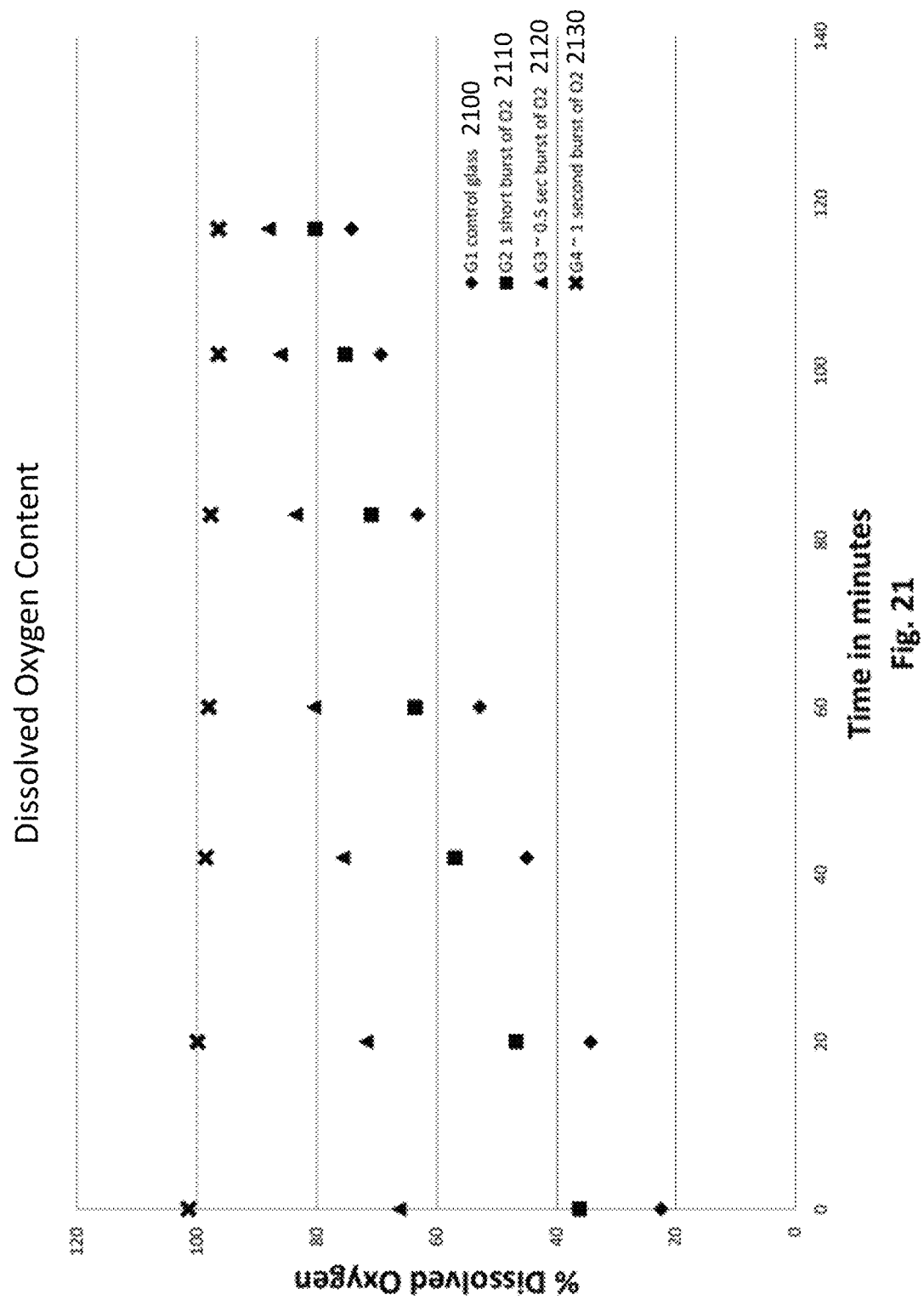
FIG. 21 is a chart of experimental data.

With reference to FIG. 21, a duration test was performed in which dissolved oxygen concentration over time in a control glass of wine is compared to dissolved oxygen concentration over time when infused with oxygen using a decanter for three different exposure durations. A bottle of Harvest Moon 2007 red blend Bordeaux style wine was opened and immediately poured into four different glasses. The first being the control glass (G1) in which no additional oxygen was added other than normal exposure to ambient air. The second glass (G2) was exposed to one short burst of oxygen with the decanter. The third glass (G3) and fourth glass (G4) were exposed to a 0.5 second burst of oxygen and a 1.0 second burst of oxygen from the decanter, respectively. The dissolved oxygen concentration was measured periodically over a two hour time period for all four glasses and the data are shown in Table 5 and FIG. 21. The initial dissolved oxygen concentration increases with increased $O_2$ infusion time. The wine exposed to a short burst (G2) from the decanter had 36.3% dissolved 02, wine sample (G3) had 66.3% dissolved 02, and a one second exposure (G4) yielded 101.4% dissolved oxygen. Even after two hours of exposure to ambient air, the control glass (G1) of wine does not reach the concentration of percent dissolved oxygen of any of the wines treated with the decanter.

TABLE 5

| Time (seconds) | Control Glass (G1) | Short burst of $O_2$ (G2) | 0.5 sec $O_2$ (G3) | 1 sec of $O_2$ (G4) |
|---|---|---|---|---|
| 0 | 22.4% | 36.3% | 66.3% | 101.4% |
| 20 | 34.4% | 46.8% | 71.8% | 99.9% |
| 42 | 45.1% | 57% | 75.7% | 98.5% |
| 60 | 52.9% | 63.6% | 80.5% | 98% |
| 83 | 63.2% | 71% | 83.6% | 97.7% |
| 102 | 69.4% | 75.3% | 86.1% | 96.4% |
| 117 | 74.2% | 80.3% | 88.1% | 96.4% |

Figure 22:
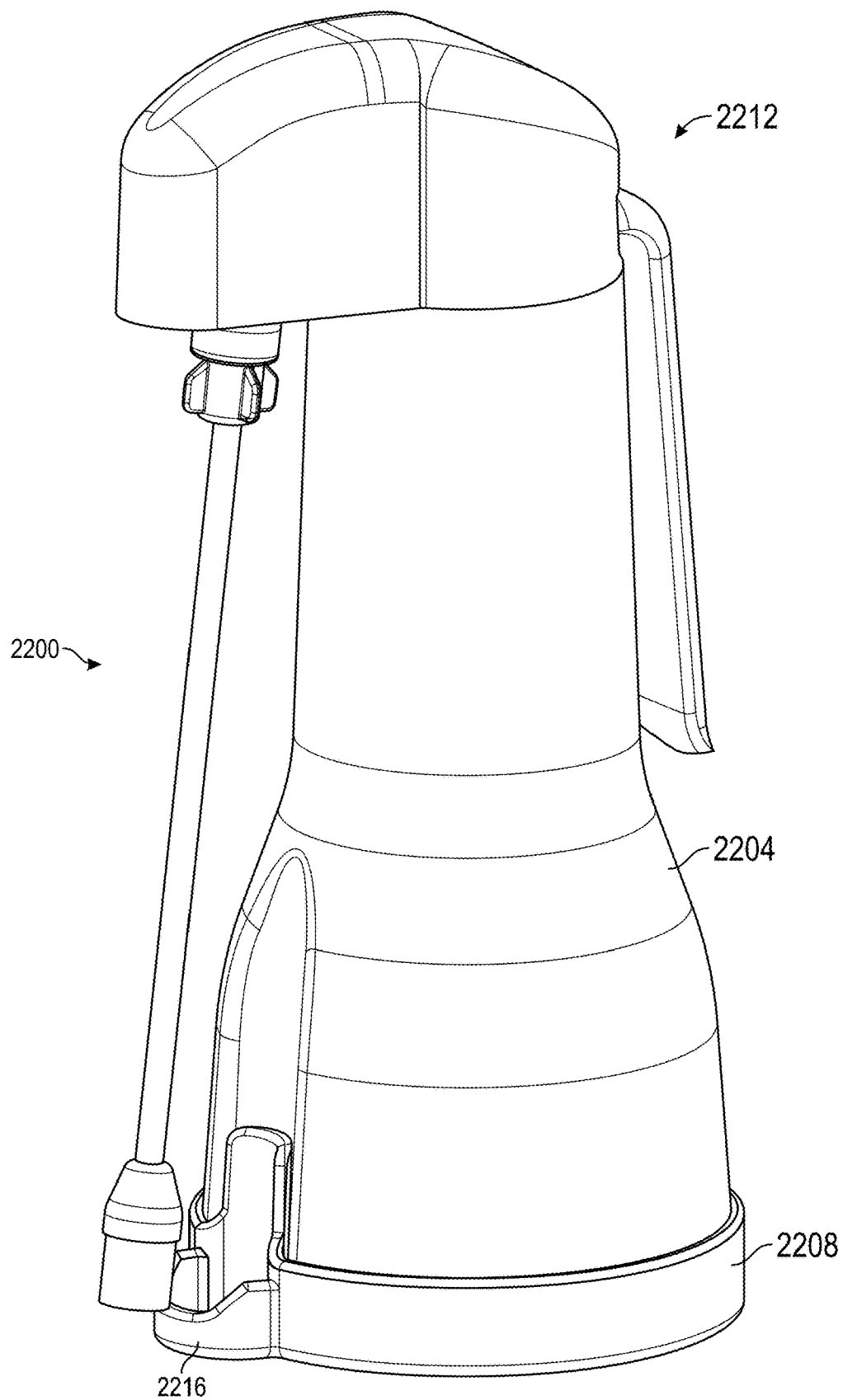
FIG. 22 is a perspective view of an example decanter.
Figure 23:
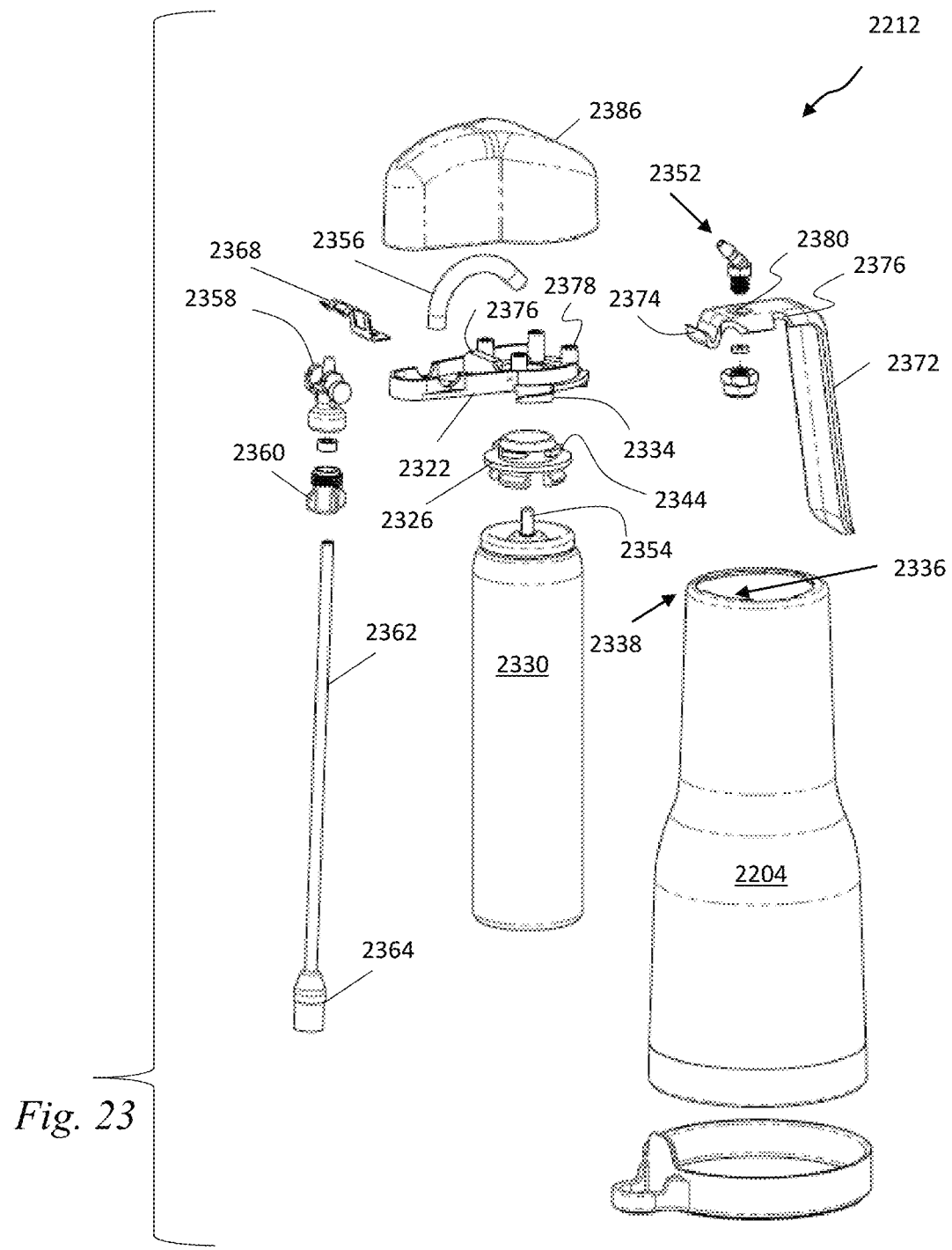
FIG. 23 is a is an exploded view of an example decanter.
Figure 24:
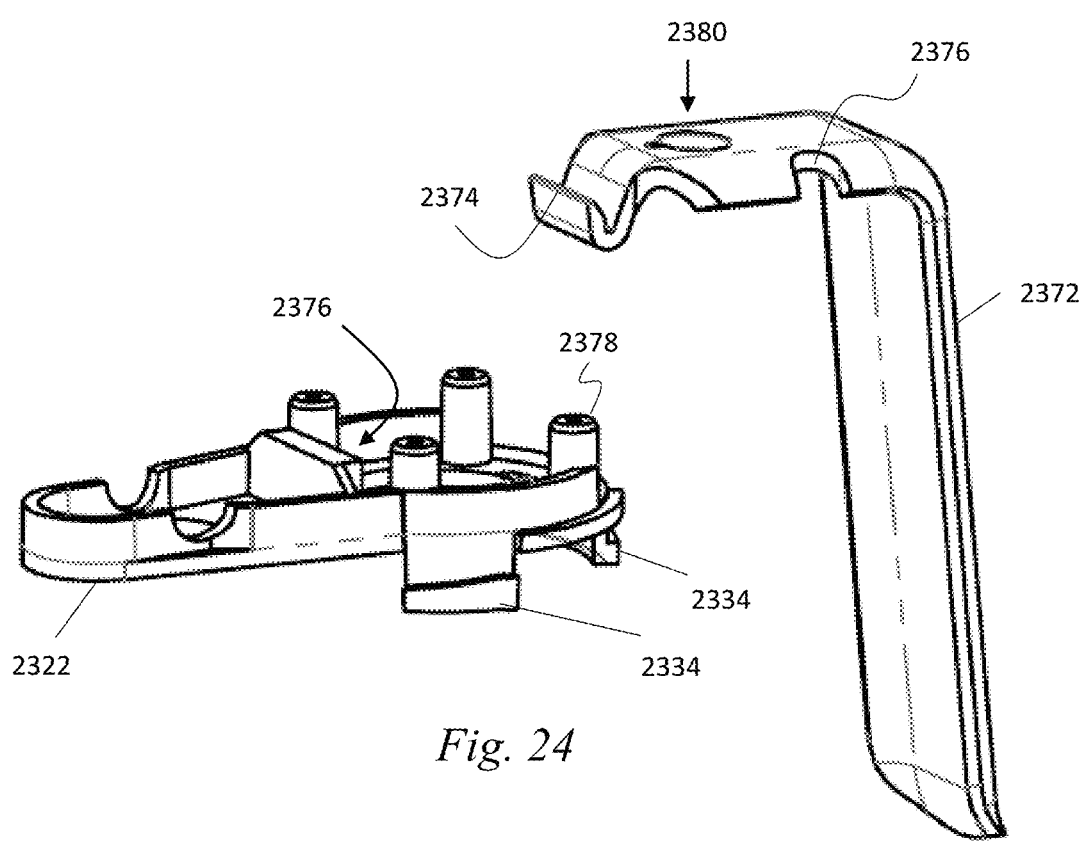
FIG. 24 is a detail of components of the decanter of FIG. 23.

With reference now to FIG. 22 a hand-held device 2200 includes a hand-held housing 2204 including a bottom 2208 and a dispensing actuator assembly 2212. The bottom 2208 can be formed integrally with the housing 2204 or formed as a removable, resilient material such as rubber or plastic that closely fits over the bottom 2208. Alternately, the bottom can include a resilient or more rigid material to be threaded or screwed onto the bottom of housing. The bottom can optionally include a drip receptacle 2216 protruding slightly from the bottom. After use, the removable bottom may be removed and cleaned.

Referring now to FIGS. 23-27 the dispensing actuator assembly 2212 includes a key plate 2322 formed to engage with the housing 2204 and with a vessel adapter 2326 connected to a vessel 2330 of pressurized gas. In one embodiment, the pressurized gas is oxygen when used to decant a liquid such as wine or spirits. In such use, the nozzle is typically placed in the liquid to be decanted. In another embodiment, the pressurized gas is argon when used to preserve wine or spirits by displacing oxygen. In such use, the nozzle is typically placed above liquid to be preserved. As illustrated, the key plate 2322 includes housing engagement teeth 2334 to engage with complementary inward facing teeth 2336 on a top side 2338 of the housing 2204. Key plate 2322 further includes vessel engagement teeth 2604 (FIG. 26) to engage with complementary outward facing teeth 2344 on the vessel adapter 2326.

In alternate embodiments, a hand-held device can omit the housing 2204 and bottom 2208 and include actuator assembly and vessel.

In use, a user may align the outward facing teeth 2344 on the vessel with the vessel engagement teeth 2604 and rotate, preferably about a third or quarter turn to lock the vessel 2330 onto the key plate 2322. Similarly, a user may then insert the combined vessel 2330 and dispensing actuator 2212 into the top side 2338 of the housing 2204 aligning the housing engagement teeth 2334 with the inward facing teeth 2336 and rotate to lock the housing and the combined vessel and dispensing actuator together. The multi-functionality of the key plate 2322 allows, among others, a common, rigid, connection point for both the housing 2204 and the vessel 2330 that obviates the need for internal, lateral support for the vessel inside the housing in contrast to the embodiment illustrated in FIGS. 13-15. Additionally, the vessel may be detached or disengaged from the key plate and other vessels of gas attached without the loss of gas contained within either of the vessels. In other words, depending on user need, different aerosol canisters can be quickly exchanged for different functionality, such as Oxygen for decanting a spirit, then Argon for preserving a bottle of wine, and then another gas, for example, Helium for application to a craft cocktail or mocktail or another function without losing the gas within each vessel so they can be used again.

Dispensing actuator assembly 2212 further includes a valve actuator assembly 2352 that aligns with and contacts a valve stem 2354 on the vessel 2330 when the vessel is in the position, where the valve stem 2354 and the valve actuator assembly 2352 form a path for gas travel from the vessel, that in turn includes tubing 2356, swivel 2358, nozzle connector 2360, adapter tube 2362 and nozzle 2364. The illustrated components comprising the path for gas travel from vessel to nozzle are not strictly all required and select ones may be removed or substituted without altering the functionality. In embodiments, a spring clip 2368 is included to hold the adapter tube 2362 and nozzle 2364 in either the retracted or extended position. A manual actuator lever 2372 includes a hinge point 2374 that engages and is retained in place with a corresponding lip 2376 on the key plate 2322. The manual actuator lever 2372 includes guides 2376 that cooperate with at least two posts 2378 on the key plate. The manual actuator lever 2372 further includes an access 2380 that surrounds the valve actuator assembly 2352 and, when the manual actuator lever 2372 is squeezed, causes the valve actuator assembly 2352 to operate the valve stem 2354 allowing contents of the vessel 2330 to travel to the nozzle 2364.

Figure 25:
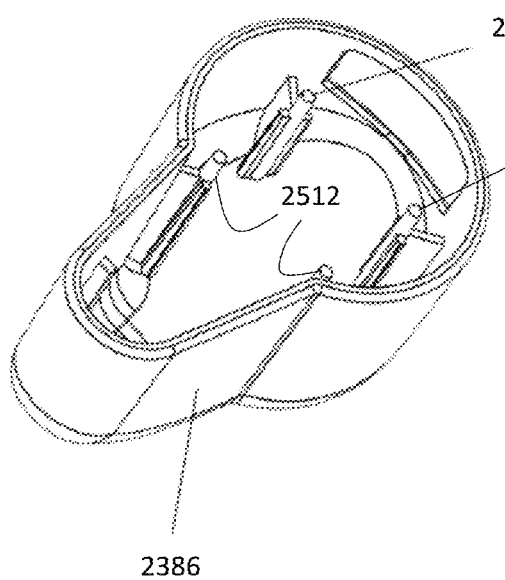
FIG. 25 is a detail of components of the decanter of FIG. 23.
Figure 26:
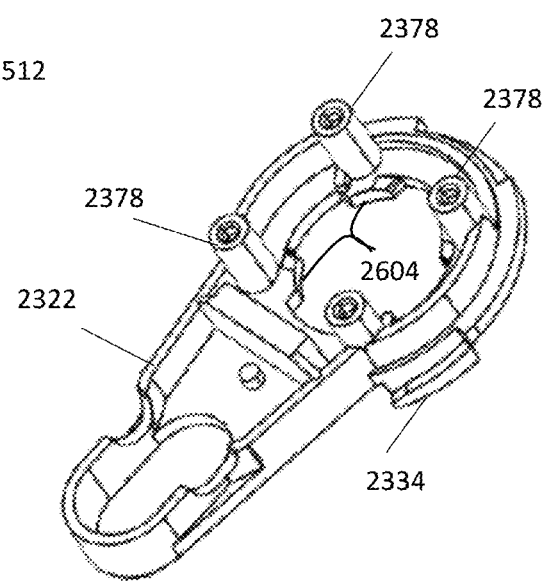
FIG. 26 is a perspective view of an exemplary key plate.
Figure 27:
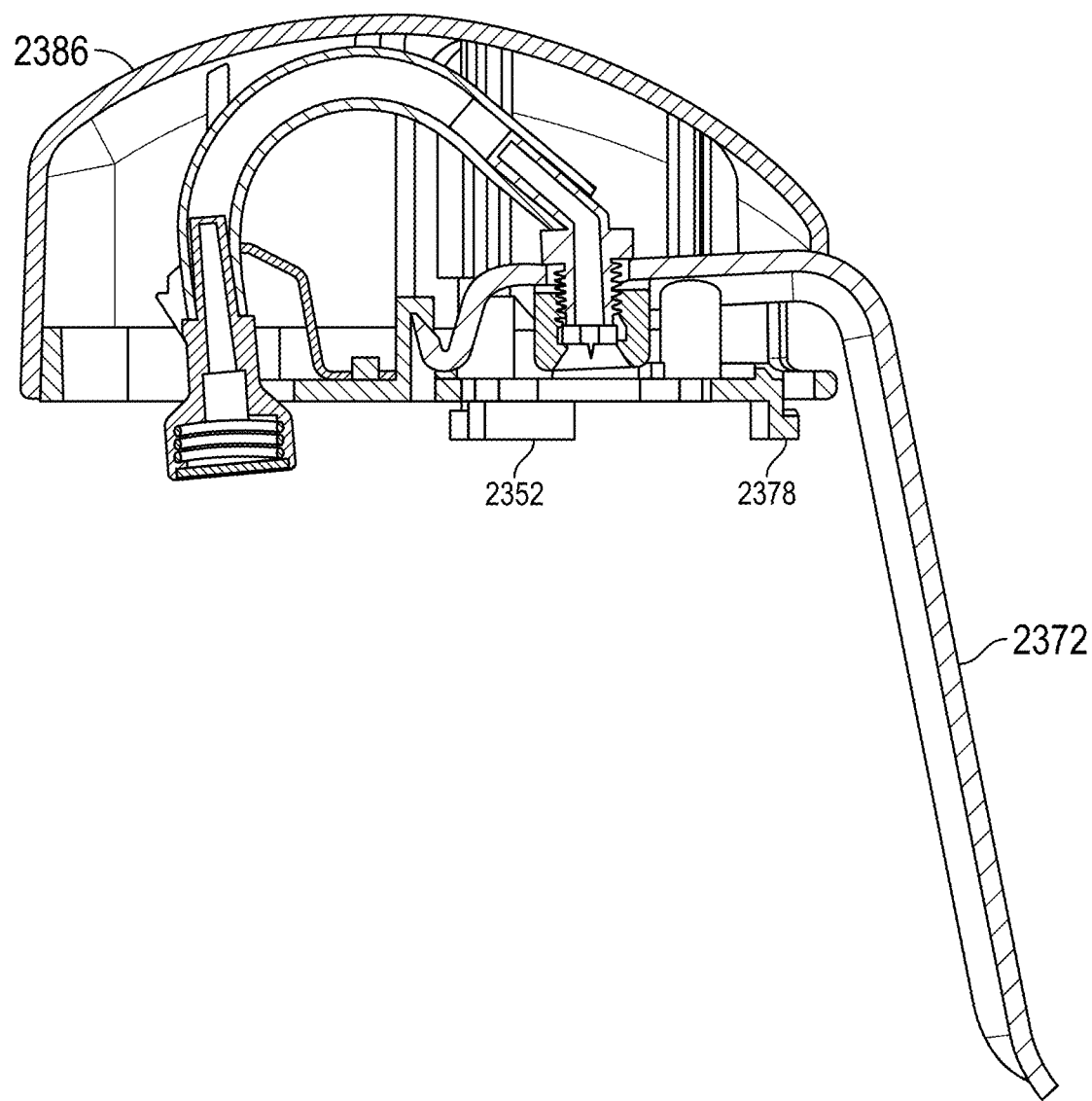
FIG. 27 is a cross-sectional view of part of an exemplary dispensing actuator assembly.

In assembled form, the dispensing actuator assembly 2212 includes a cover 2386 shaped to conform with the key plate 2322 to enclose and hold the components of the assembly in place. In one embodiment, posts 2378 mechanically connect with stakes 2512 (FIG. 25) on an internal side of the cover 2386. In FIGS. 25 and 26, the illustrated four stakes 2512 mechanically connect with the corresponding four posts 2378 such as by heat staking, thermal weld, screws, rivets, or the like.

Figure 28:
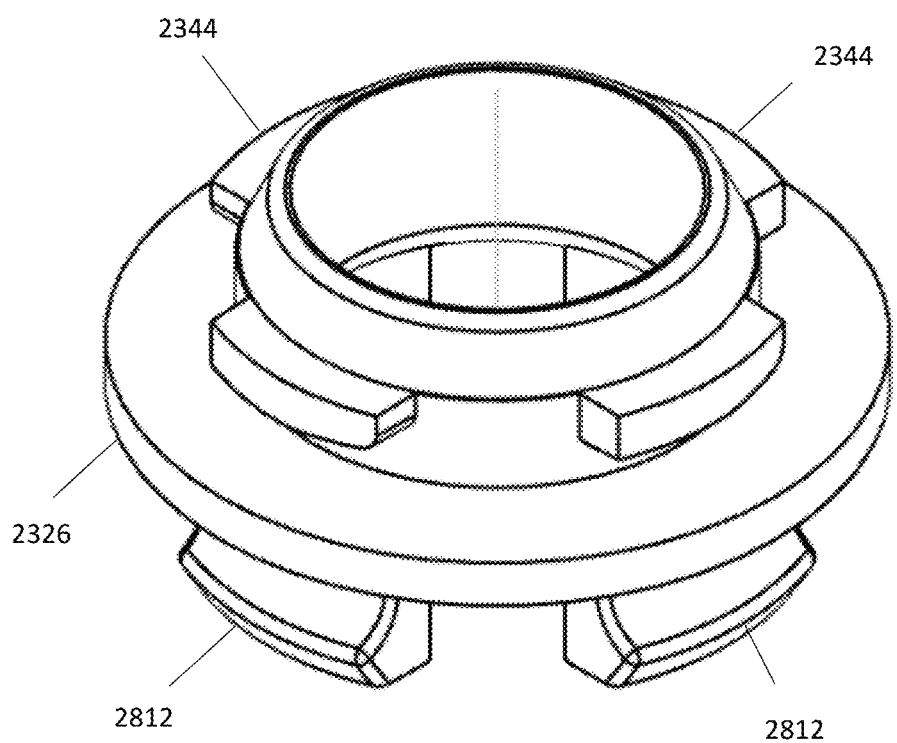
FIG. 28 is a top perspective view of a vessel adapter.
Figure 29:
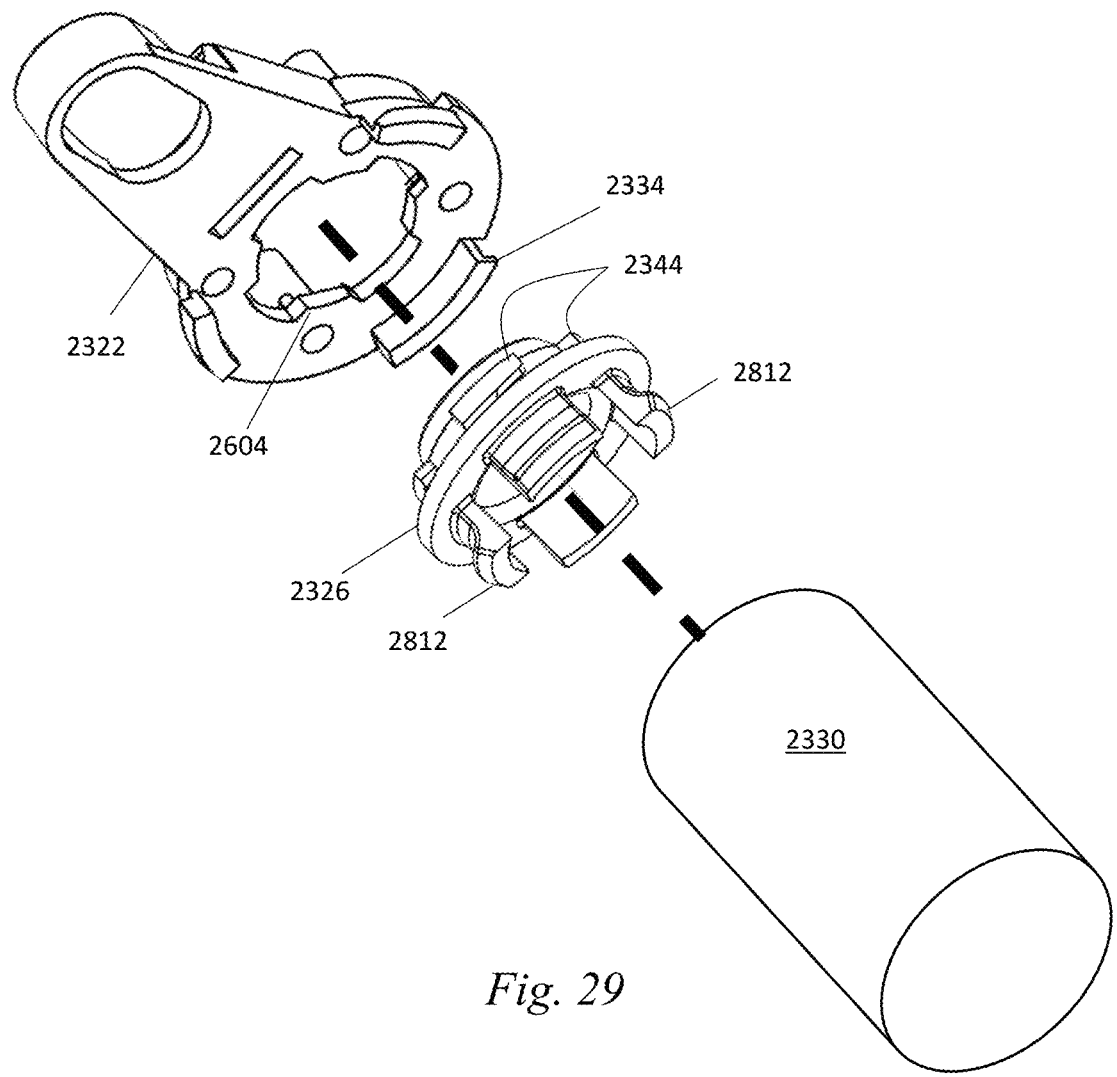
FIG. 29 is an exploded view of components of an example gas dispensing device.

With reference now to FIGS. 28 and 29, vessel adapter 2326 includes outward facing teeth 2344 to rotatably engage with vessel engagement teeth 2604 on the key plate 2322. Vessel adapter 2326 further includes fingers 2812 that are press fit and glued into place on the top of the vessel 2330, otherwise known as the "valve cup." Other attachment mechanisms are possible provided that the vessel adapter and vessel rotate together to permit engagement of the outward facing teeth 2344 and the vessel engagement teeth 2604. The four fingers illustrated engage the valve cup and are press fit into place following the application of an adhesive. This is one method of preventing the rotational slipping for the engagement and disengagement of the vessel loading.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. For example, while certain of the devices depicted and described herein employ pressurized oxygen, oxygen enriched air, air or a diaphragm or other air pump, the gas source may alternately include an oxygen generating or distributing device such as an oxygen generator or oxygen concentrator without loss of functionality. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

The invention claimed is:

1. A hand-held device to apply gas to a liquid, the device comprising:
   a hand-held housing having an open bottom end and an opposed open top end, the top end including first inward facing teeth;
   a resilient bottom sized to closely fit over the open bottom end and including drip receptacle; and
   a dispensing actuator assembly including a key plate having first engagement teeth to engage the first inward facing teeth on the top end of the housing, the key plate further having second engagement teeth inward of the first engagement teeth where the second engagement teeth connect to a vessel adapter connected to a vessel of compressed gas and where the vessel adapter includes second outward facing teeth to rotatably engage with the second engagement teeth and hold the vessel in a position, the dispensing actuator assembly further including an actuator that aligns with a valve stem on the vessel when the vessel is in the position, where the valve stem and the actuator combine to comprise a path for gas travel from the vessel, the actuator connected to a manual actuating lever disposed external to and extending partially along the hand-held housing and user operated to urge the actuator to engage the valve stem and selectively release the compressed gas along the path.

2. The hand-held device as set forth in claim 1, further comprising an adapter tube having a first, proximal end and a second, distal end with a path for fluid communication there between, where the first, proximal end connects to the path for gas travel through a swivel to receive an amount of the pressurized gas.

3. The hand-held device as set forth in claim 2, further comprising a nozzle connected to the adapter tube at the second, distal end; wherein a user placing the nozzle into a container of liquid and operating the handle for at least 0.5 seconds causes the compressed gas to travel along the path and through the adapter and achieve dissolved oxygen content in the liquid of at least 50%.

4. The hand-held device as set forth in claim 1, further comprising a vessel containing pressurized gas.

5. The hand-held device as set forth in claim 4, where the pressurized gas comprises oxygen.

6. The hand-held device as set forth in claim 4, where the pressurized gas comprises argon.

7. The hand-held device as set forth in claim 1, where the liquid comprises wine.

8. The hand-held device as set forth in claim 1, where the liquid comprises alcohol.

9. The hand-held device as set forth in claim 1, where the liquid comprises spirits.

10. The hand-held device as set forth in claim 1, where the liquid comprises a non-alcoholic beverage.

11. A gas dispensing device comprising:
- a vessel containing pressurized gas and including a valve stem selectively establishing a path for gas to pass from the vessel, and including a vessel adapter connected to a top side of the vessel and surrounding the valve stem where the vessel adapter includes engagement teeth extending radially outward from the vessel adapter;
- a hand-held housing surrounding the vessel, the housing including a top end having engagement teeth extending radially inward from the housing;
- a dispensing actuator assembly including a key plate having first engagement teeth to engage the engagement teeth extending radially inward from the housing, the key plate further having second engagement teeth extending radially inward where second engagement teeth rotatably connect to the engagement teeth extending radially outward from the vessel adapter, where the dispensing actuator further includes a lever to selectively depress the valve stem and permit passage of an amount of gas from the vessel;
- an adapter having a first, proximal end and a second, distal end with a path for fluid communication there between, where the first, proximal end connects to the valve stem to receive the gas passing from the vessel; and
- a nozzle in fluid communication with the adapter at the second, distal end of the adapter.

12. The gas dispensing device as set forth in claim 11, wherein the pressurized gas comprises oxygen, oxygen enriched air, air, or argon.

13. The gas dispensing device as set forth in claim 11, wherein the adapter is movable between a first stored position along a side of the hand-held housing and a second position angled away from the hand-held housing.

14. The gas dispensing device as set forth in claim 11, wherein the adapter comprises at least a pair of a telescoping components that may be extended to a user selected length.

15. The gas dispensing device as set forth in claim 11, wherein the adapter comprises at least a pair of a telescoping components that may be extended to a user selected position.

16. A method of adding a gas to a container of liquid, the method comprising:
- (a) Aligning first engagement teeth on a key plate and first inward facing teeth on a top end of a housing;
- (b) Rotating the housing with respect to the key plate, connecting the housing and key plate together;
- (c) Aligning second engagement teeth on the key plate with outward facing teeth on a vessel adapter connected to a vessel of compressed gas;
- (d) Rotating the vessel adapter with respect to the key plate, connecting the vessel and key plate together; and
- (e) Operating a lever extending from the key plate and disposed external to the housing to depress a valve stem on the vessel so that compressed gas exits the vessel along a path of fluid communication from the valve stem to a nozzle disposed in the container of liquid.

17. The method as set forth in claim 16, where steps (c) and (d) precede steps (a) and (b).

18. The method as set forth in claim 16, further comprising placing the nozzle into an alcoholic beverage.

19. The method as set forth in claim 16, further comprising placing the nozzle into a non-alcoholic beverage.

20. The method as set forth in claim 16, further comprising placing the nozzle into the container and above the liquid.

* * * * *